(12) United States Patent
Shang et al.

(10) Patent No.: US 11,755,359 B2
(45) Date of Patent: Sep. 12, 2023

(54) METHODS AND APPARATUS TO IMPLEMENT INTELLIGENT SELECTION OF CONTENT ITEMS FOR PROVISIONING

(71) Applicant: VMware, Inc., Palo Alto, CA (US)

(72) Inventors: Jie Shang, Burlington, MA (US); Teresa Rosa, Burlington, MA (US); Sudershan Bhandari, Burlington, MA (US); Rushikesh Vyas, Burlington, MA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 17/592,284

(22) Filed: Feb. 3, 2022

(65) Prior Publication Data

US 2023/0244514 A1 Aug. 3, 2023

(51) Int. Cl.
*G06F 9/455* (2018.01)
*G06F 9/50* (2006.01)
*H04L 67/2895* (2022.01)

(52) U.S. Cl.
CPC ........ *G06F 9/45558* (2013.01); *G06F 9/5077* (2013.01); *H04L 67/2895* (2013.01); *G06F 2009/45562* (2013.01); *G06F 2009/45595* (2013.01); *G06F 2209/505* (2013.01)

(58) Field of Classification Search
CPC ..... G06F 2209/505; G06F 2009/45562; G06F 2009/45595; G06F 9/45558; G06F 9/5077; H04L 67/2895
See application file for complete search history.

(56) References Cited

U.S. PATENT DOCUMENTS

| 8,954,978 | B1* | 2/2015 | Brandwine | G06F 9/5077 |
| | | | | 718/104 |
| 9,491,569 | B1* | 11/2016 | Sandhu | H04W 24/04 |
| 10,447,752 | B2* | 10/2019 | McClure | H04N 19/172 |
| 10,528,262 | B1* | 1/2020 | Shmuylovich | G06F 3/067 |
| 2009/0276771 | A1* | 11/2009 | Nickolov | H04L 67/1008 |
| | | | | 718/1 |

(Continued)

OTHER PUBLICATIONS

Silva et al., "Data Storage and Sharing for Mobile Devices in Multi-region Edge Networks", IEEE 21st International Symposium WoWMoM, Aug. 21, 2020.*

(Continued)

*Primary Examiner* — Todd L Barker
(74) *Attorney, Agent, or Firm* — Hanley, Flight & Zimmerman, LLC

(57) ABSTRACT

Methods, apparatus, systems, and articles of manufacture are disclosed to intelligently select content items for provisioning. In one example, the apparatus includes content library querying circuitry that queries a subscription guide database table to generate a list of subscriber content items linked to a target published content item indicated in the request. The apparatus also includes content library selection circuitry to select a first content item from a group of content items that include the generated list of the subscriber content items and the target published content item, the first content item corresponds to a first data access cost that is less than or equal to a second data access cost of a second content item in the group. The apparatus also includes virtual machine provisioning circuitry to provision the virtual machine on the target host with access to the first content item.

21 Claims, 15 Drawing Sheets

(56) References Cited

U.S. PATENT DOCUMENTS

| | | | |
|---|---|---|---|
| 2014/0067702 A1* | 3/2014 | Rathod | G06Q 50/01 |
| | | | 705/319 |
| 2016/0203528 A1* | 7/2016 | Saha | H04L 41/0896 |
| | | | 705/34 |
| 2017/0220661 A1* | 8/2017 | Cao | H04L 67/1095 |
| 2019/0079659 A1* | 3/2019 | Adenwala | G06F 3/04842 |
| 2019/0188418 A1* | 6/2019 | Ginzton | H04L 63/0236 |

OTHER PUBLICATIONS

Podnar et al., "Mobile Push: delivering content to mobile users", Proceedings 22nd International Conference on Distributed Computing Systems Workshops, Jul. 2, 2002.*

VMware, "LibraryItemModel," vSphere Content REST APIs, VMware Developer Documentation BETA published on Oct. 19, 2021, retrieved from https://web.archive.org/web/20211019234034/https://developer.vmware.com/docs/vsphere-automation/latest/content/data-structures/Library/ItemModel/ on Apr. 21, 2023, 4 pages.

VMware, "LibraryModel," vSphere Content REST APIs, VMware Developer Documentation BETA, published on Oct. 17, 2021, retrieved from https://web.archive.org/web/20211017125816/https://developer.vmware.com/docs/vsphere-automation/latest/content/data-structures/LibraryModel/ on Apr. 21, 2023, 8 pages.

VMware, "vcenter vm template library items: deploy," Rest API—deploy, published Sep. 25, 2021, retrieved from https://web.archive.org/web/20210925160517/https://vdc-repo.vmware.com/vmwb-repository/dcr-public/423e512d-dda1-496f-9de3-851c28ca0814/0e3f6e0d-8d05-4f0c-887b-3d75d981bae5/VMware-vSphere-Automation-SDK-REST-6.7.0/docs/apidocs/operations/com/vmware/vcenter/vm_template/library_items.deploy-operation.html on Apr. 21, 2023, 8 pages.

* cited by examiner

METHODS AND APPARATUS TO IMPLEMENT INTELLIGENT SELECTION OF CONTENT ITEMS FOR PROVISIONING

FIELD OF THE DISCLOSURE

This disclosure relates generally to provisioning virtual machines and, more particularly, to intelligently selecting content items for provisioning.

BACKGROUND

In recent years, virtual machine provisioning in a network has become commonplace to efficiently share resources and provide a customized level of resource support for tasks. Virtual machines are provisioned in networks that include clusters of hosts and associated datastores. Additionally, publisher/subscriber models of content libraries in datastores allow for effective sharing of content (e.g., data) across multiple hosts on a network.

Figure 1:
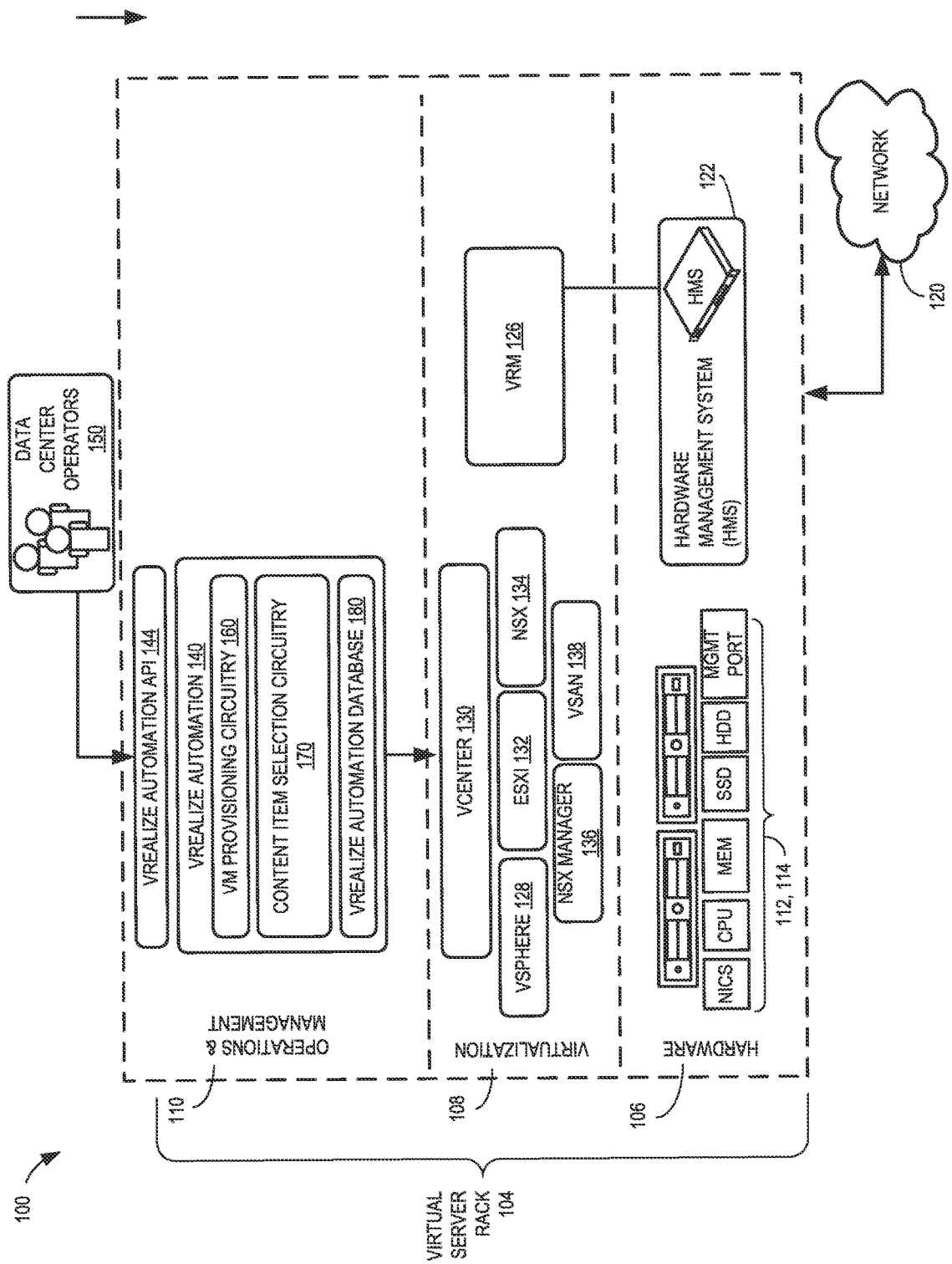
FIG. 1 is an example architecture in which a vRealize Automation® management platform is utilized to provision a virtual machine using a content item through a publisher/subscriber model.

The figures are not to scale.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

The vRealize Automation® management platform by VMware supports virtual machine provisioning on a host computer/computing device (e.g., a "host") using local content library items. Local content library items are stored in a local datastore associated with (e.g., coupled to) the host. An example virtual machine provisioning request indicates the host and an associated datastore within which the virtual machine will be provisioned. For example, a "host" may be a computing device that includes a processor, memory, and storage, among other hardware components and the associated datastore may be a database/data structure stored in a storage device that is included on the host. Thus, in some examples, the process of provisioning a virtual machine on a host will include storing an image of the virtual machine on the associated datastore and then executing the virtual machine image on the host hardware, where at least part of the virtual machine image is loaded from the associated datastore into the host's memory and executed on one or more of the host(s) processors. The virtual machine image stored in the associated datastore includes the state of the host hardware and/or the state of an operating system, among other states.

The example virtual machine provisioning request also indicates one or more target content items (e.g., data, information, etc.) from one or more target content libraries are to be provided (e.g., given access) to the provisioned virtual machine for use. A content library (with a content item) is located in a datastore. In some examples, the target content library needed for access to the target content item is not located in the associated datastore on the host, but rather in a datastore residing on a different host. When a virtual machine provisioning request indicates a target datastore that is not the datastore that the content item resides on (e.g., a remote content library on a remote datastore), the provisioning performance will be compromised due to slow network data transfer speed to copy the content item metadata information and the disk files from the remote datastore to the associated datastore on the host wherein the virtual machine is provisioned. The greater number of virtual machines to be provisioned that require large data transfers during the provisioning, the slower the network will become.

Examples disclosed herein can provide a publisher/subscriber provisioning service to allow a virtual machine on a host to be provisioned access (e.g., granted subscriber access) to a subscriber content library. In some examples, the subscriber content library is less remote than the requested remote content library (e.g., closer in physical proximity to the physical server host of the virtual machine). In some examples, a vRealize Automation® management platform can reduce the amount of data transfers across hosts/clusters to provide a more efficient cross-host/cluster virtual machine provisioning process.

Examples disclosed herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/ management counterparts, etc.) and the physical infrastructure (e.g., servers, physical storage, network switches, etc.).

FIG. 1 is an example architecture 100 in which a vRealize Automation® management platform 140 is utilized to provision a virtual machine with a content item through a publisher/subscriber model. The example architecture 100 of FIG. 1 includes a hardware layer 106, a virtualization layer 108, and an operations and management (OAM) component 110. In the illustrated example, the hardware layer 106, the virtualization layer 108, and the operations and management (OAM) component 110 are part of the example virtual server rack 104. The virtual server rack 104 of the illustrated example is based on one or more example physical racks.

Example physical racks are a combination of computing hardware and installed software that may be utilized by a customer to create and/or add to a virtual computing environment. For example, the physical racks may include processing units (e.g., multiple blade servers), network switches to interconnect the processing units and to connect the physical racks with other computing units (e.g., other physical racks in a network environment such as a cloud computing environment), and/or data storage units (e.g., network attached storage, storage area network hardware, etc.). The example physical racks are prepared by the system integrator in a partially configured state to enable the computing devices to be rapidly deployed at a customer location (e.g., in less than 2 hours). For example, the system integrator may install operating systems, drivers, operations software, management software, etc. The installed components may be configured with some system details (e.g., system details to facilitate intercommunication between the components of two or more physical racks) and/or may be prepared with software to collect further information from the customer when the virtual server rack is installed and first powered on by the customer.

The example virtual server rack 104 is configured to configure example physical hardware resources 112, 114 (e.g., physical hardware resources of the one or more physical racks), to virtualize the physical hardware resources 112, 114 into virtual resources, to provision virtual resources for use in providing cloud-based services, and to maintain the physical hardware resources 112, 114 and the virtual resources.

The example hardware layer 106 of FIG. 1 includes an example hardware management system (HMS) 122 that interfaces with the physical hardware resources 112, 114 (e.g., processors, network interface cards, servers, switches, storage devices, peripherals, power supplies, etc.). The HMS 122 is configured to manage individual hardware nodes such as different ones of the physical hardware resources 112, 114. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 104 in a hardware-independent manner. The HMS 122 also supports rack-level boot-up sequencing of the physical hardware resources 112, 114 and provides services such as secure resets, remote resets, and/or hard resets of the physical hardware resources 112, 114.

The example virtualization layer 108 includes an example virtual rack manager (VRM) 126. The example VRM 126 communicates with the HMS 122 to manage the physical hardware resources 112, 114. The example VRM 126 creates the example virtual server rack 104 out of underlying physical hardware resources 112, 114 that may span one or more physical racks (or smaller units such as a hyper-appliance or half rack) and handles physical management of those resources. The example VRM 126 uses the virtual server rack 104 as a basis of aggregation to create and provide operational views, handle fault domains, and scale to accommodate workload profiles. The example VRM 126 keeps track of available capacity in the virtual server rack 104, maintains a view of a logical pool of virtual resources throughout the SDDC life-cycle, and translates logical resource provisioning to allocation of physical hardware resources 112, 114. The example VRM 126 interfaces with components of a virtual system solutions provider, such as an example VMware vSphere® virtualization infrastructure components suite 128, an example VMware vCenter® virtual infrastructure server 130, an example ESXi™ hypervisor component 132, an example VMware NSX® network virtualization platform 134 (e.g., a network virtualization component or a network virtualizer), an example VMware NSX® network virtualization manager 136, and an example VMware vSAN™ network data storage virtualization component 138 (e.g., a network data storage virtualizer). In the illustrated example, the VRM 126 communicates with these components to manage and present the logical view of underlying resources such as hosts and clusters. The example VRM 126 also uses the logical view for orchestration and provisioning of workloads.

The VMware vSphere® virtualization infrastructure components suite 128 of the illustrated example is a collection of components to setup and manage a virtual infrastructure of servers, networks, and other resources. Example components of the VMware vSphere® virtualization infrastructure components suite 128 include the example VMware vCenter® virtual infrastructure server 130 and the example ESXi™ hypervisor component 132.

The example VMware vCenter® virtual infrastructure server 130 provides centralized management of a virtualization infrastructure (e.g., a VMware vSphere® virtualization infrastructure). For example, the VMware vCenter® virtual infrastructure server 130 provides centralized management of virtualized hosts, clusters of hosts, and virtual machines from a single console and/or to provide IT administrators with access to inspect and manage configurations of components of the virtual infrastructure.

The example ESXi™ hypervisor component 132 is a hypervisor that is installed and runs on servers in the example physical hardware resources 112, 114 to enable the servers to be partitioned into multiple logical servers to create virtual machines.

The example VMware NSX® network virtualization platform 134 (e.g., a network virtualization component or a network virtualizer) virtualizes network resources such as physical hardware switches to provide software-based virtual networks. The example VMware NSX® network virtualization platform 134 enables treating physical network resources (e.g., switches) as a pool of transport capacity. In some examples, the VMware NSX® network virtualization platform 134 also provides network and security services to virtual machines with a policy driven approach.

The example VMware NSX® network virtualization manager 136 manages virtualized network resources such as physical hardware switches to provide software-based virtual networks. In the illustrated example, the VMware NSX® network virtualization manager 136 is a centralized management component of the VMware NSX® network virtualization platform 134 and runs as a virtual appliance on an ESXi host. In the illustrated example, a VMware NSX® network virtualization manager 136 manages a single vCenter server environment implemented using the VMware vCenter® virtual infrastructure server 130. In the illustrated example, the VMware NSX® network virtualization manager 136 is in communication with the VMware vCenter® virtual infrastructure server 130, the ESXi™ hypervisor component 132, and the VMware NSX® network virtualization platform 134.

The example VMware vSAN™ network data storage virtualization component 138 is software-defined storage for use in connection with virtualized environments implemented using the VMware vSphere® virtualization infrastructure components suite 128. The example VMware vSAN™ network data storage virtualization component clusters server-attached hard disk drives (HDDs) and solid state drives (SSDs) to create a shared datastore for use as virtual storage resources in virtual environments.

Although the example VMware vSphere® virtualization infrastructure components suite 128, the example VMware vCenter® virtual infrastructure server 130, the example ESXi™ hypervisor component 132, the example VMware NSX® network virtualization platform 134, the example VMware NSX® network virtualization manager 136, and the example VMware vSAN™ network data storage virtualization component 138 are shown in the illustrated example as implemented using products developed and sold by VMware, Inc., some or all of such components may alternatively be supplied by components with the same or similar features developed and sold by other virtualization component developers.

The virtualization layer 108 of the illustrated example, and its associated components are configured to run virtual machines. However, in other examples, the virtualization layer 108 may additionally or alternatively be configured to run containers. A virtual machine is a data computer node that operates with its own guest operating system on a host using resources of the host virtualized by virtualization software. A container is a data computer node that runs on top of a host operating system without the need for a hypervisor or separate operating system.

The virtual server rack 104 of the illustrated example enables abstracting the physical hardware resources 112, 114. In some examples, the virtual server rack 104 includes a set of physical units (e.g., one or more racks) with each unit including physical hardware resources 112, 114 such as server nodes (e.g., compute+storage+network links), network switches, and, optionally, separate storage units. From a user perspective, the example virtual server rack 104 is an aggregated pool of logic resources exposed as one or more vCenter ESXi™ clusters along with a logical storage pool and network connectivity. In examples disclosed herein, a cluster is a server group in a virtual environment. For example, a vCenter ESXi™ cluster is a group of physical servers in the physical hardware resources 112, 114 that run ESXi™ hypervisors (developed and sold by VMware, Inc.) to virtualize processor, memory, storage, and networking resources into logical resources to run multiple virtual machines that run operating systems and applications as if those operating systems and applications were running on physical hardware without an intermediate virtualization layer.

In the illustrated example, the OAM component 110 is configured to provide different services such as heat-map service, capacity planner service, maintenance planner service, events and operational view service, virtual rack application workloads manager service, and virtual and on-premises virtual machine infrastructure management service, among other services.

In the illustrated example, the vRealize Automation® management platform 140 is an automation management platform that can be used to build and manage a multi-vendor infrastructure. In some examples, the vRealize Automation® management platform includes an on-premise implementation to manage infrastructure at the physical location of the vRealize Automation® management platform installation through a localized network. In other examples, the vRealize Automation® management platform includes a cloud implementation to manage infrastructure in the cloud. The example vRealize Automation® management platform 140 provides a plurality of services that enable self-provisioning of virtual machines in private and public cloud environments, physical machines (install OEM images), applications, and IT services according to policies defined by administrators. For example, the vRealize Automation® management platform 140 may include a cloud assembly service to create and deploy machines, applications, and services to a cloud infrastructure, a code stream service to provide a continuous integration and delivery tool for software, and a broker service to provide a user interface to non-administrative users to develop and build templates for the cloud infrastructure when administrators do not need full access for building and developing such templates. The example vRealize Automation® management platform 140 may include a plurality of other services, not described herein, to facilitate building and managing the multi-vendor cloud infrastructure. In some examples, the example vRealize Automation® management platform 140 may be offered as an on-premise (e.g., on-prem) software solution wherein the vRealize Automation® management platform 140 is provided to an example customer to run on the customer servers and customer hardware. In other examples, the example vRealize Automation® management platform 140 may be offered as a Software as a Service (e.g., SaaS) wherein at least one instance of the vRealize Automation® management platform 140 is deployed on a cloud provider (e.g., Amazon Web Services).

In the illustrated example of FIG. 1, the architecture 100 includes example content item selection circuitry 170. The example content item selection circuitry 170 is a component of the vRealize Automation® management platform 140. The example content item selection circuitry 170 is in communication with example virtual machine (VM) provisioning circuitry 160 (e.g., a provisioning engine), example vRealize Automation® database 180, and the example vRealize Automation® management platform application programming interface (API) 144 (e.g., vRealize Automation® API 144). The vRealize Automation® API 144 provides a programming interface to access the vRealize Automation® management platform 140 by users, such as data center operators 150. The example content item selection circuitry 170 allows for selecting a content item to be accessed in a content item database on the basis of reducing the cost of the access. As used herein, content item is data or information that is computer-generated and/or user-generated and accessed by processes and/or users for configuring and/or use by one or more applications and/or the operating system in a host, for productivity, and/or for media consumption purposes. The data or information is metadata, one or more files, and/or any other type of data and or information stored in a datastore. The selected content item is to be provisioned with the example VM provisioning circuitry 160. The example content item selection circuitry 170 is described in further detail below in connection with FIG. 2. The example vRealize Automation® management platform 140 interfaces/communicates with the vCenter® virtual infrastructure server 130 to implement the provisioning of virtual machines on a network.

Although the example vRealize Automation® management platform 140 and the example content item selection circuitry 170 are shown in the illustrated example as implemented using products developed and sold by VMware, Inc., some or all of such components may alternatively be supplied by components with the same or similar features developed and sold by other virtualization component developers. For example, the utilities leveraged by the cloud automation center may be any type of cloud computing platform and/or cloud management platform that delivers and/or provides management of the virtual and physical components of the architecture 100.

Figure 2:
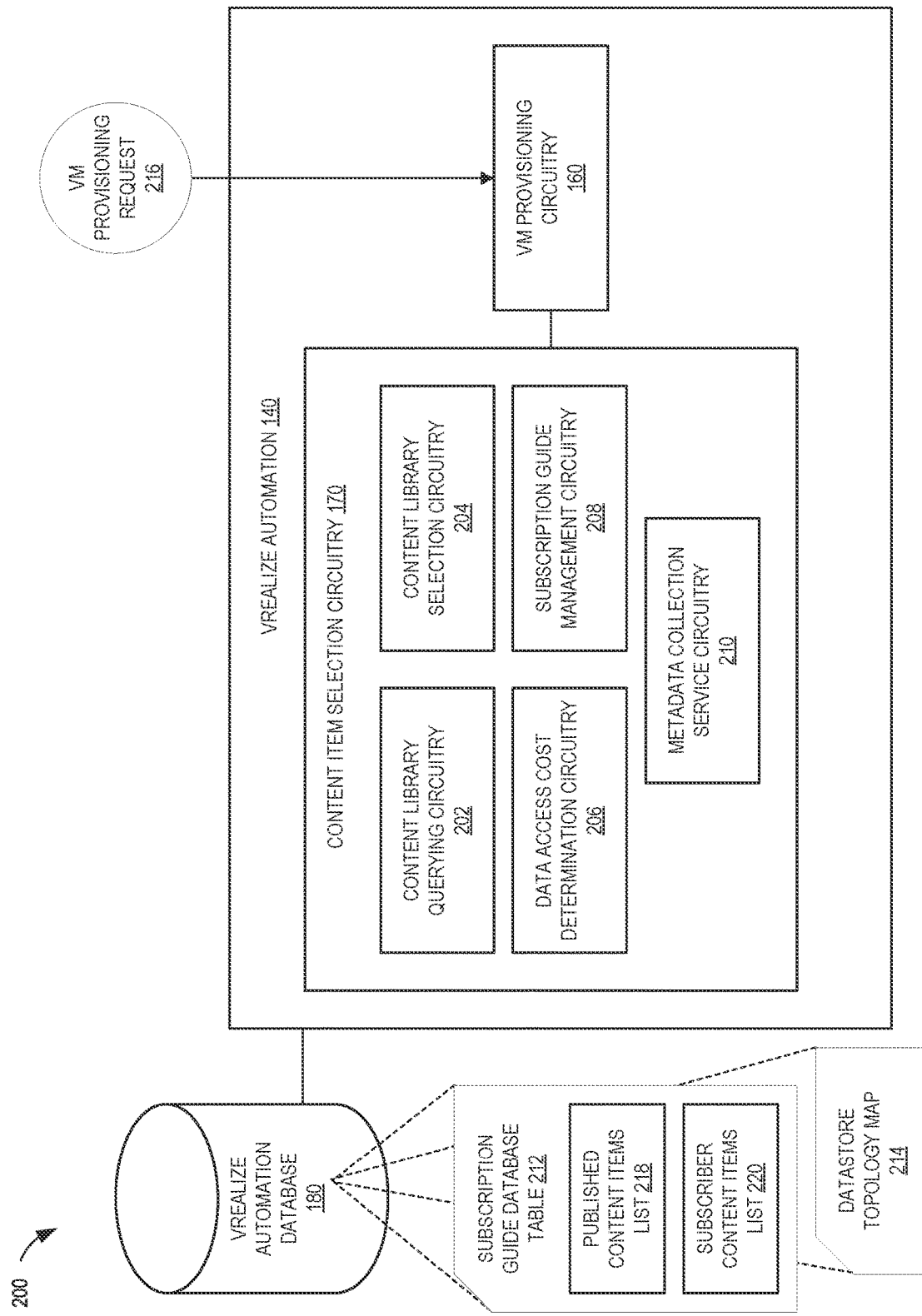
FIG. 2 is a block diagram of a cloud management platform such as the example vRealize Automation® management platform offered by VMware, Inc.

FIG. 2 is a block diagram of a cloud management platform 200 such as the example vRealize Automation® management platform 140 offered by VMware, Inc. The example vRealize Automation® management platform 140 is a provisioning service with networked discrete components used in the deployment and lifecycle management of different cloud infrastructure resources, such as virtual machines. The example vRealize Automation® management platform 140 includes the example VM provisioning circuitry 160, the example content item selection circuitry 170, and the example vRealize Automation® database 180. The example content item selection circuitry 170 includes example content library querying circuitry 202, example content library selection circuitry 204, example data access cost determination circuitry 206, example subscription guide management circuitry 208, and example metadata collection service circuitry 210. The example vRealize Automation® database 180 includes an example subscription guide database table 212, which is discussed in greater detail below in connection with FIG. 3, as well as an example published content items list 218 and subscriber content items list 220 stored in the subscription guide database table 212, and datastore topology map 214.

In the illustrated example of FIG. 2, the VM provisioning circuitry 160 (e.g., provisioning engine, lifecycle management service circuitry) is to deploy and manage the lifecycle of virtual machines (e.g., workloads). In some examples, the VM provisioning circuitry 160 receives (e.g., obtains) a VM provisioning request 216 to provision a virtual machine. In different examples, the VM provisioning request 216 is sent by a database administrator, a virtual infrastructure administration service, a user, an application or an operating system on a host, or any other entity that may want to provision a virtual machine.

The example VM provisioning request 216 includes additional information to provide specific details regarding the virtual machine. For example, the VM provisioning request 216 may include a target host where the virtual machine is to be provisioned and reside. In some examples, the target host (e.g., a host machine/computing device) is to associate with and execute the virtual machine. In some examples, the VM provisioning request 216 also includes a specification of one or more additional resources for the virtual machine to utilize. Resources may include a number of processors and/or processor cores in the host to be provisioned for the virtual machine to access, an amount of memory to be allocated from the host to be provisioned for use by the virtual machine, a target datastore to be provisioned to store an image of the virtual machine, and data for the virtual machine to be provisioned access (e.g. granted access). In some examples, the data is in the form of content items in a content library. In some examples, a publisher/subscriber model includes a published content library stored in a datastore on a network and one or more subscriber content libraries stored in one or more other datastores on the network (or on other networks) that subscribe to the published content library. For example, the published content library has a set of content items that make up its library and each subscriber content library has a copy of all of the content items (e.g., a subscriber content library) in the published content library. Thus, in some examples, the VM provisioning request includes a target published content item used to provision the virtual machine. In some examples, only one content item will be used to provision each virtual machine (e.g., the content item metadata and/or files will be copied over to the target host's associated target datastore).

In the illustrated example of FIG. 2, the content item selection circuitry 170 includes several components utilized to select content items to be provisioned with virtual machines. In some examples, the content item selection circuitry 170 includes a shell that provides an interface between the content library querying circuitry 202, the content library selection circuitry 204, the data access cost determination circuitry 206, the subscription management circuitry 208, the metadata collection service circuitry 210 and the remainder of the vRealize Automation® management platform circuitry 140. For example, the content item selection circuitry 170 may include an API to allow the vRealize Automation® management platform circuitry 140 and/or the VM provisioning circuitry 160 access to the functionalities provided by the content library querying circuitry 202, the content library selection circuitry 204, the data access cost determination circuitry 206, the subscription management circuitry 208, and/or the metadata collection service circuitry 210

Figure 3:
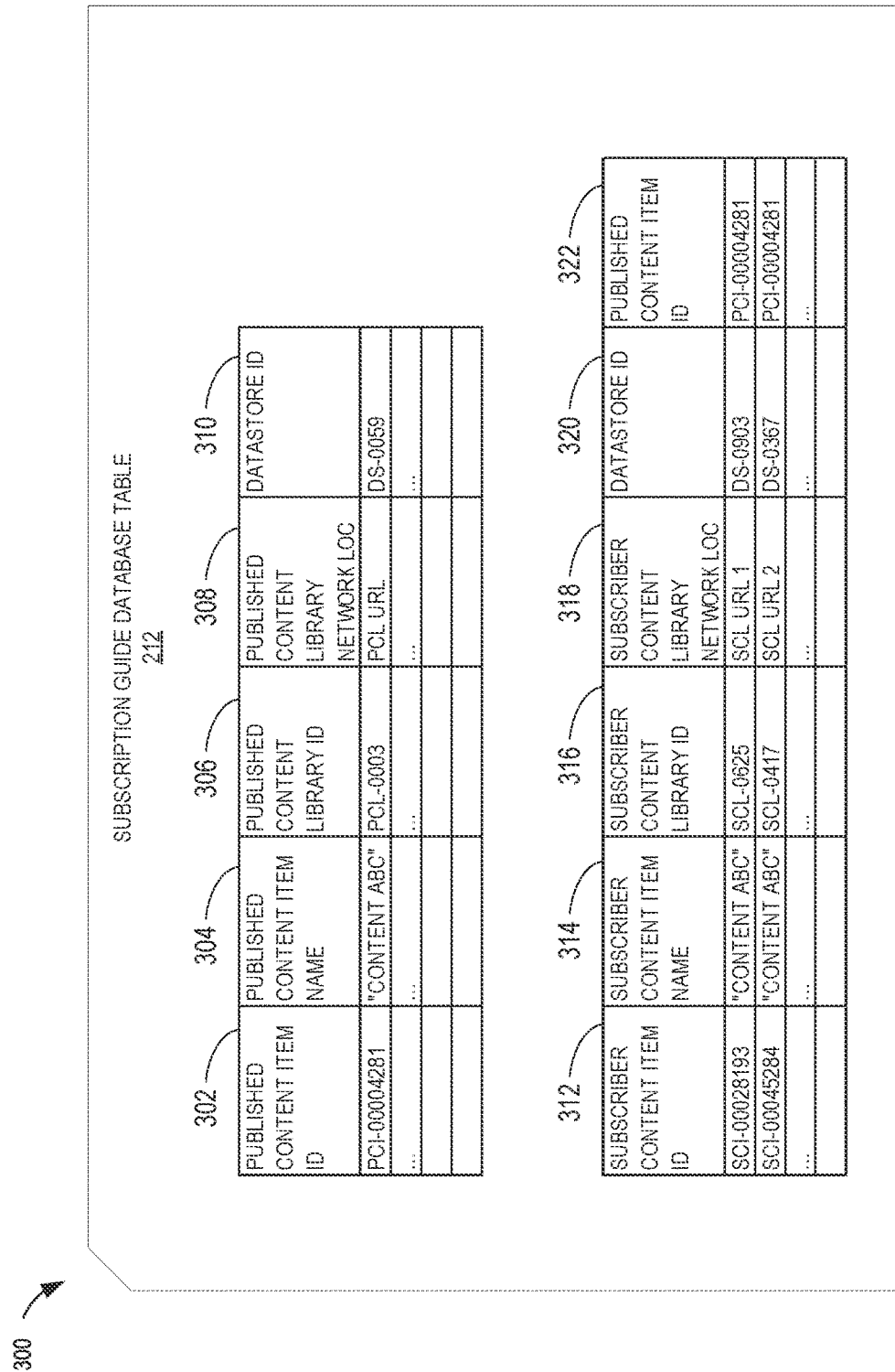
FIG. 3 illustrates example data stored in a vRealize Automation® database including an example subscription guide database table.

In the illustrated example of FIG. 2, the example content library querying circuitry 202 is to query the subscription guide database table 212 for a list of subscriber content items linked to the target published content item (e.g., in FIG. 3, all subscriber content items in the subscription guide database table 212 that are linked to the target published content item PCI-00004281, such as subscriber content items SCI-00028193 and SCI-00045284). In the illustrated example of FIG. 2, each subscriber content item in the list of subscriber content items linked to the target published content item is in a separate subscriber content library. The example list of subscriber content libraries subscribe to the published content library with the original version of the published content item (e.g., in FIG. 3, all subscriber content libraries in the subscription guide database table 212 that are linked to the target published content library PCL-0003, such as subscriber content libraries SCL-0625 and SCI-0417). In some examples, the content library querying circuitry 202 accesses the published content item by looking up a subscriber content item copy of the published content item in a subscriber content library, using the content item ID as the lookup value. Thus, in some examples, the list of subscriber content items is an actual list of data associated with subscriber content items (e.g., the content item ID and location of the subscriber content item). And in other examples, the list of subscriber content items is a list of data associated with both the subscriber content items and the subscriber content libraries that the subscriber content items are stored within (e.g., the content item ID and the location of the subscriber content library, where the subscriber content item is accessed by performing a lookup in the subscriber content library using the content item ID).

FIG. 3 illustrates example data 300 stored in a vRealize Automation® database 180 including an example subscription guide database table 212. In the illustrated example of FIG. 3, the subscription guide database table 212 includes at least the following data:

For each content item that is published in a publisher content library, the published content item ID 302, the published content item name 304, the published content library ID 306, a corresponding published content library network location 308 (e.g., a uniform resource locator (URL)), and the datastore ID 310 the publisher content library is stored within. In some examples, this published content item table with data 302-310 corresponds to published content items list 218 in FIG. 2.

For each subscriber content item in a subscriber content library, the subscriber content item ID 312, the subscriber content item name 314, the subscriber content library ID 316, a corresponding subscriber content library network location 318, the datastore ID 320 the subscriber content library is stored within, and the corresponding publisher content item ID 322. In some examples, this subscriber content item table with data 312-312 corresponds to subscriber content items list 220 in FIG. 2.

In some examples, each published content item and subscriber content item has a record in the subscription guide database table 212. The published content item and the subscriber content item are related through the published content item ID 302 and 322. In some examples, each subscriber content library in a publisher/subscriber model always stores a copy of every published content item in the published content library. Additional and/or alternative data may be stored in the example subscription guide database table 212 including a time of last update of the example subscription guide database table 212 and a time of last modification to each of the content items listed.

In some examples, each subscriber content library in a publisher/subscriber model stores a subscriber content item copy of every published content item in the published content library. If a virtual machine provisioning process requests a content item for a target host that is not stored on the target datastore, the metadata and files of the content item will be transferred to the target datastore.

In some examples, the subscription guide database table 212 includes a list of published content items (e.g., the list of content items in the published content library), and a set of lists of subscriber content items, where each list in the set corresponds to a single subscriber content library.

Returning to FIG. 2, in some examples, the vRealize Automation® management platform 140 includes means for querying a subscription guide database table for a list of subscriber content items linked to the target published content item. In some examples, the published content item and each subscriber content item from the list of subscriber content items are each located in one of a set of datastores on the network. For example, the means for querying the subscription guide database table may be implemented by content library querying circuitry 202. In some examples, the content library querying circuitry 202 may be implemented by machine executable instructions such as that implemented by at least block 804 of FIG. 8 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the content library querying circuitry 202 is implemented by other hardware logic circuitry, hardware implemented state machines, and/or any other combination of hardware, software, and/or firmware. For example, the content library querying circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Returning to the illustrated example of FIG. 2, the content library selection circuitry 204 is to select a first content item (e.g., a content item identified by the content item ID 302 of FIG. 3) from a group of content items including the list of subscriber content items and the target published content item. In such example, the selected first content item incurs a data access cost that is less than or equal to any other content item in the group of content items. The example target published content item is considered in the selection process because if the data access cost of the target published content item is at least equal to the smallest data access cost, then the published content item will be used for provisioning. In some examples, the content library selection circuitry 204 receives the data access cost value from the example data access cost determination circuitry 206 to make the selection of the first content item based on the data access cost value. In some examples, the content library selection circuitry 204 provides the selection of the first content item by providing the network location of the first content item to the VM provisioning circuitry 160 (e.g., the network location of the first content item may be the datastore ID (310 or 320) of the first content item and/or the published content library network location 308 or subscriber content library network location 318 of the first content item. In response, the VM provisioning circuitry 160 provisions a requesting virtual machine with access to the first content item by providing access rights to the virtual machine to access the content library storing the first content item, which may be one of the subscriber content libraries or the published content library.

In some examples, the vRealize Automation® management platform 140 includes means for selecting a content item from the group of content items including the list of subscriber content items and the published content item to provision with the virtual machine. In some examples, the content item has a data access cost less than or equal to one or more other content items in the group. For example, the means for selecting the content item may be implemented by content library selection circuitry 204. In some examples, the content library selection circuitry 204 may be implemented by machine executable instructions such as that implemented by at least block 806 of FIG. 8 and 910 of FIG. 9 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the content library selection circuitry 204 is implemented by other hardware logic circuitry, hardware implemented state machines, and/or any other combination of hardware, software, and/or firmware. For example, the content library selection circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.)

structured to perform the corresponding operation without executing software or firmware, but other structures are likewise appropriate.

Figure 9:
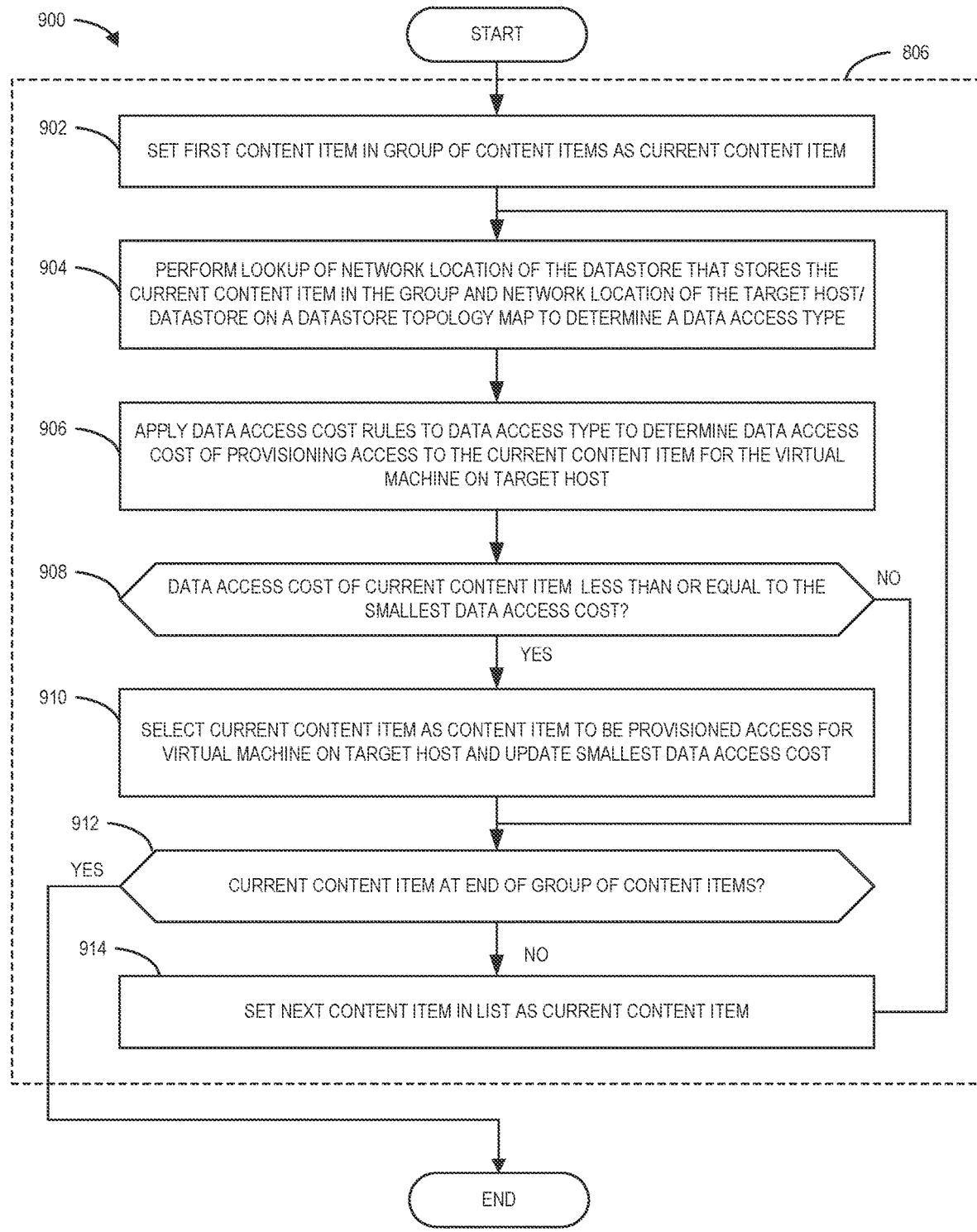
FIG. 9 is a flowchart representative of example machine readable instructions and/or example operations that may be executed and/or instantiated by processor circuitry to compare data access costs among subscriber content items to determine which subscriber content item to select for provisioning.

In some examples, the means for selecting the content item may select a current content item as the target content item accessible by the virtual machine provisioned on the target host (with reference to the block 910 selection in FIG. 9).

In the illustrated example of FIG. 2, the example data access cost determination circuitry 206 determines a data access cost of a published content item or subscriber content item. In some examples, the data access cost is associated with a data access type which specifies whether a data access operation is performed within a same host or across multiple hosts within a same cluster of hosts (e.g., a host cluster) or across multiple host clusters. In some examples, a data access "type" is defined as one of: A) an intra-host access, B) an intra-cluster access, or C) an inter-cluster access. In examples disclosed herein, an intra-host access is a data access performed within a host, an intra-cluster access is a data access performed across multiple hosts within a cluster of hosts, and an inter-cluster access is a data access performed across hosts in different host clusters.

In some examples, data accesses include a transfer of data (e.g., data transfer occurs when data that resides in a datastore at a first network location is accessed from host and/or datastore at a second a second network location). Thus, in some examples, the data access cost refers to the cost of transferring data from the origin network location of the data to the destination network location of the data. In different examples, the cost of transferring data may refer to the speed/bandwidth of the data transfer, the latency of the data transfer, the degradation in network quality due to the data transfer or any one or more of those representative cost metrics and/or one or more other cost metrics.

In reference to the three types of data accesses defined above, the example intra-host access involves the least data access cost (e.g., an intra-host data access cost) among the three types of accesses because data transfer happens between two storage locations within a single host. The example intra-cluster access involves the next least data access cost (e.g., an intra-cluster data access cost) because even though the data transfer happens between hosts, it involves two hosts in a local cluster, which may allow for a higher bandwidth potential due to origin/destination locality. The example inter-cluster data access type involves the highest data access cost (e.g., an inter-cluster data access cost) of the three access types due to the lack of locality of the origin to the destination. The process to determine the data access cost is described in further detail below in connection with FIG. 9.

In some examples, a network location is represented by an address (e.g., an internet protocol (IP) address). Although the network location is described as referencing (e.g., pointing to) content libraries (e.g., published and subscriber content libraries in a publisher/subscriber model), in some examples, the network location is the address of the datastore that a given published content library or subscriber content library is stored within.

In some examples, the vRealize Automation® management platform 140 includes means for determining a data access cost for a virtual machine on a target host to access a published content item and each of its associated subscriber content items in a group of content items by applying a set of data access cost rules to a comparison of a network location of the target datastore to a network location of each datastore storing a content item in the group of content items. For example, the means for determining a data access cost may be implemented by data access cost determination circuitry 206. In some examples, the data access cost determination circuitry 206 may be implemented by machine executable instructions such as that implemented by at least block 906 and additionally supported in implementation by blocks 902, 904, 908, 912, and 914 of FIG. 9 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the data access cost determination circuitry 206 is implemented by other hardware logic circuitry, hardware implemented state machines, and/or any other combination of hardware, software, and/or firmware. For example, the data access cost determination circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Returning to the example VM provisioning circuitry 160, once the first content item has been selected from the group of content items based on a least data access cost value, the VM provisioning circuitry 160 provisions the virtual machine on the target host and target datastore. Additionally, in some examples, the VM provisioning circuitry 160 provisions access to the selected first content item for the virtual machine being provisioned. In some examples, to "provision access" refers to providing a link to a requesting entity for use in accessing the subscriber content library that was selected.

In some examples, the vRealize Automation® management platform 140 includes means for provisioning a virtual machine on a target host and target datastore with access to a selected first content item. For example, the means for provisioning may be implemented by VM provisioning circuitry 160. In some examples, the VM provisioning circuitry 160 may be implemented by machine executable instructions such as that implemented by at least block 808 of FIG. 8 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the VM provisioning circuitry 160 is implemented by other hardware logic circuitry, hardware implemented state machines, and/or any other combination of hardware, software, and/or firmware. For example, the VM provisioning circuitry 160 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 6:
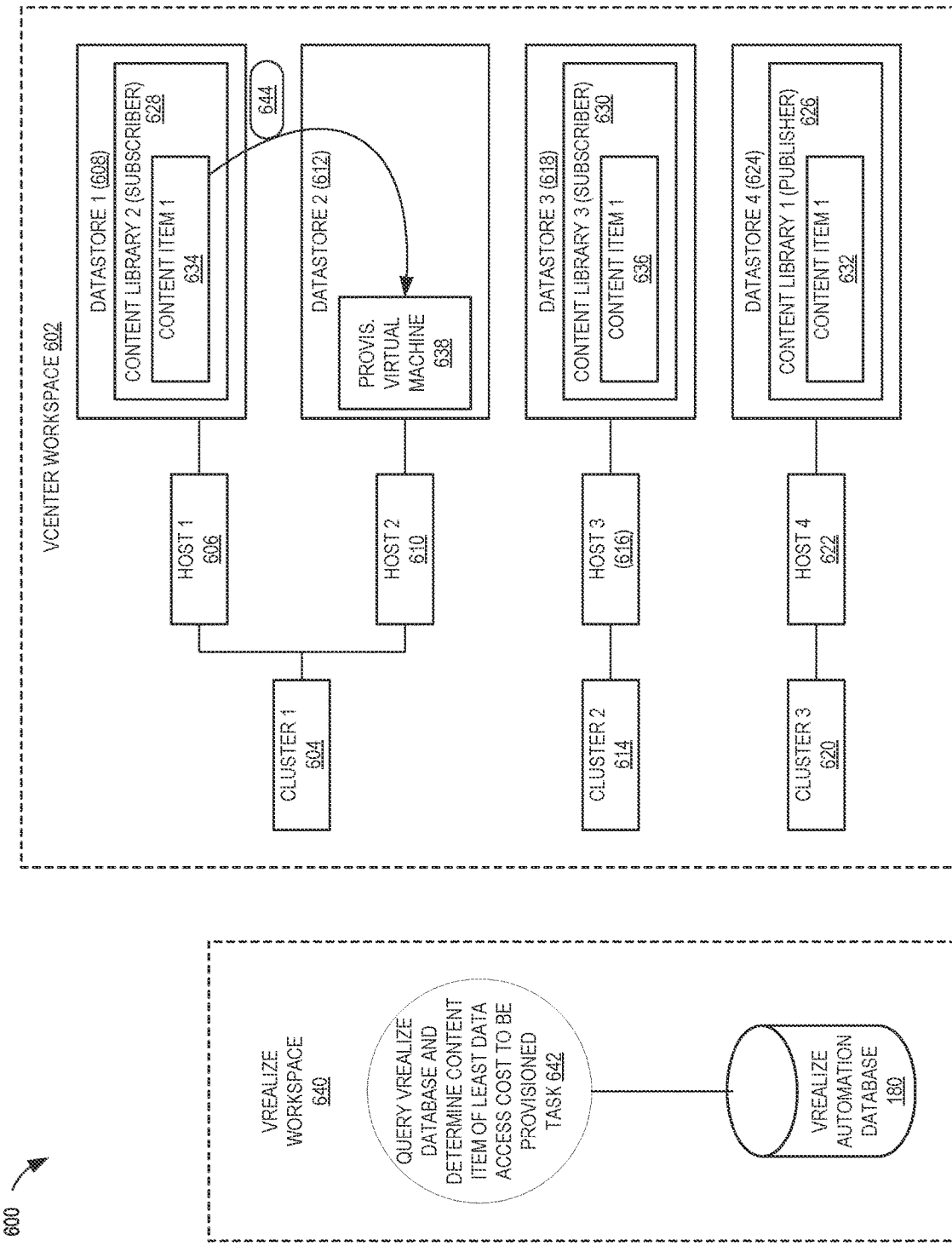
FIG. 6 is an illustration of an example network system implementing a second content item provisioning option in a publisher/subscriber model.

In the illustrated example of FIG. 2, the subscription guide management circuitry 208 initiates a request to add a new subscriber content library on a target datastore (e.g., the datastore that is being provisioned the virtual machine image, such as provisioned virtual machine 638 in FIG. 6). In some examples, through a selection of the subscriber content item, discussed above, it is determined that the least data access cost is still more than an intra-host data access cost. In some examples, if a target host (e.g., the host being provisioned the virtual machine that is requesting the content item) provides an allowance to add subscriptions, the request from the subscription guide management circuitry 208 attempts to lessen the data access cost for future accesses to the subscriber content item by providing a local host copy of the subscriber content item.

In some examples, the vRealize Automation® management platform 140 includes means for initiating a request to add a new subscriber content library on a target datastore. For example, the means for initiating a request may be implemented by subscription guide management circuitry 208. In some examples, the subscription guide management circuitry 208 may be implemented by machine executable instructions such as that implemented by at least block 1004, and supported in implementation by block 1002 of FIG. 10, executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the subscription guide management circuitry 208 is implemented by other hardware logic circuitry, hardware implemented state machines, and/or any other combination of hardware, software, and/or firmware. For example, the subscription guide management circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for initiating a request also determines if the determined data access cost is greater than an intra-host data access cost.

In the illustrated example of FIG. 2, the metadata collection service circuitry 210 collects at least a portion of publication metadata associated with the published content library (e.g., a published content library identified by the published content library ID 304) and each of the subscriber content libraries (e.g., the subscriber content libraries identified by the subscriber content library IDs 308, 312) from each datastore that stores both types of libraries. In some examples, in response to a request to update the subscription guide database table 212 or during a normal update time window designated for updating the subscription guide database table 212, the metadata collection service circuitry 210 collects metadata from the datastore storing the published content library and from the datastores storing the subscriber content libraries associated with the published content library. As used herein, metadata refers to data that describes and gives information about the data in the subscription guide database table 212. The collected metadata is used by the metadata collection service circuitry 210 to update one or more data (e.g., pieces of information) in the subscription guide database table 212, such as adding, modifying, and/or removing published content item IDs 302, published content item names 304, published content library IDs 306, published content library network locations 310, subscriber content item IDs 312, subscriber content item names 314, subscriber content library IDs 316, subscriber content library network locations 318, datastore IDs 320, published content item IDs 322, and additionally or alternatively, any one or more other data that may be included in the subscription guide database table 212.

In some examples, the vRealize Automation® management platform 140 includes means for managing metadata performs collecting at least a portion of publication metadata associated with a published content library and each subscriber content library. The means for managing metadata also performs updating the subscription guide database table with the at least portion of the collected publication metadata. For example, the means managing metadata may be implemented by metadata collection service circuitry 210. In some examples, the metadata collection service circuitry 210 may be implemented by machine executable instructions such as that implemented by at least blocks 1104 and 1106 of FIG. 11 and the implementation further supported by block 1102 of FIG. 11, executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the metadata collection service circuitry 210 is implemented by other hardware logic circuitry, hardware implemented state machines, and/or any other combination of hardware, software, and/or firmware. For example, the metadata collection service circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for collecting is to determine if a request to update (or a scheduled time to update) the subscription guide database table 212 has been received (e.g., obtained).

Figure 4:
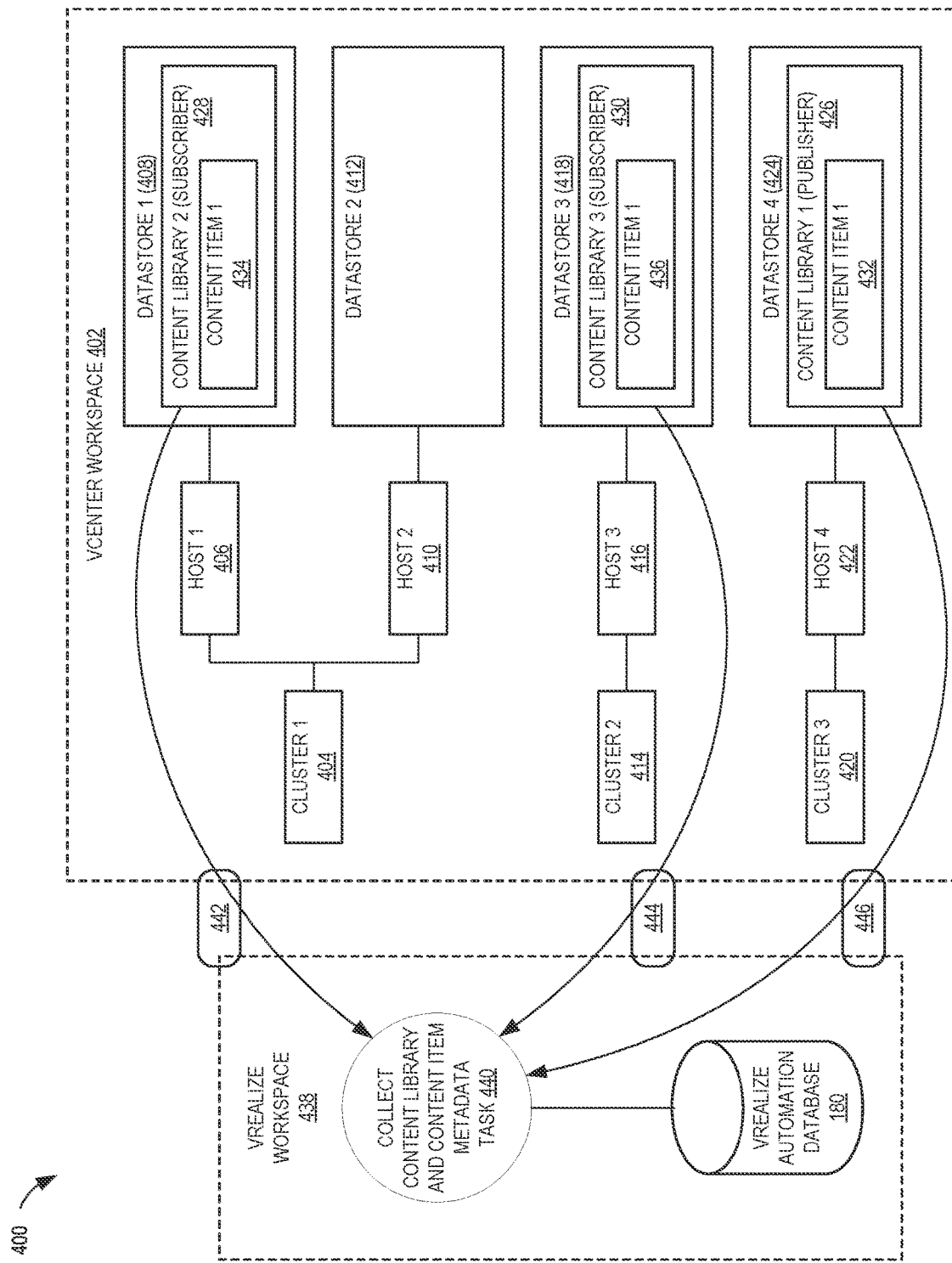
FIG. 4 is an illustration of an example network system implementing a collection process to update a subscription guide database table for use by a publisher/subscriber model of content item provisioning.

FIG. 4 is an illustration of an example network system 400 implementing a collection process to update a subscription guide database table 212 for use by publisher/subscriber model of content item provisioning. In the illustrated example of FIG. 4, a VMware vCenter® virtual infrastructure server workspace 402 includes a diagram of clusters, hosts, and datastores that are under the purview of a VMware vCenter® virtual infrastructure server 130. The example VMware vCenter® virtual infrastructure server workspace 402 includes cluster 1 (404), cluster 2 (414), and cluster 3 (420). Example cluster 1 (404) includes host 1 (406) and associated datastore 1 (408) as well as host 2 (410) and associated datastore 2 (412). Example cluster 2 (414) includes host 3 (416) and associated datastore 3 (418). Example cluster 3 (420) includes host 4 (422) and associated datastore 4 (424). In some examples, "workspace" refers to the hardware infrastructure in the network that is managed in part by a virtual infrastructure management server such as the VMware vCenter® virtual infrastructure server 130 of FIG. 1.

The example network system 400 includes a publisher/subscriber model of content item provisioning (e.g., provisioning content items for access by provisioned virtual machines). In some examples, such a publisher/subscriber model includes a publisher content library, such as content library 1 (426), and one or more subscriber content libraries, such as content library 2 (428) and content library 3 (430). Within the content libraries described is an example content item 1. In some examples, the published copy (e.g., original copy) of content item 1 (432) is stored in content library 1 (426). In some examples, the subscriber copies of content item 1 (434 and 436) are stored in content libraries 2 and 3 (428 and 430), respectively.

In the illustrated example of FIG. 4, a vRealize Automation® workspace 438 includes a task 440 to be implemented by vRealize Automation® management platform 140 to enable the publisher/subscriber model of content item provisioning in the example network system 400. Notably, the example vRealize Automation® management platform 140 collects both publisher and subscriber content library and content item metadata (442, 444, and 446) to be stored in the vRealize Automation® database 180 in a subscription guide database table 212 (FIGS. 2 and 3). The example content item metadata (442, 444, 446) enables the creation of the subscription guide database table 212 and/or updates to the subscription guide database table 212. In some examples, the content item metadata (442, 444, 446) are information shown in FIG. 3. When the subscription guide database table 212 is created/updated, the example network system 400 is capable of provisioning content items through a publisher/subscriber model.

Figure 5:
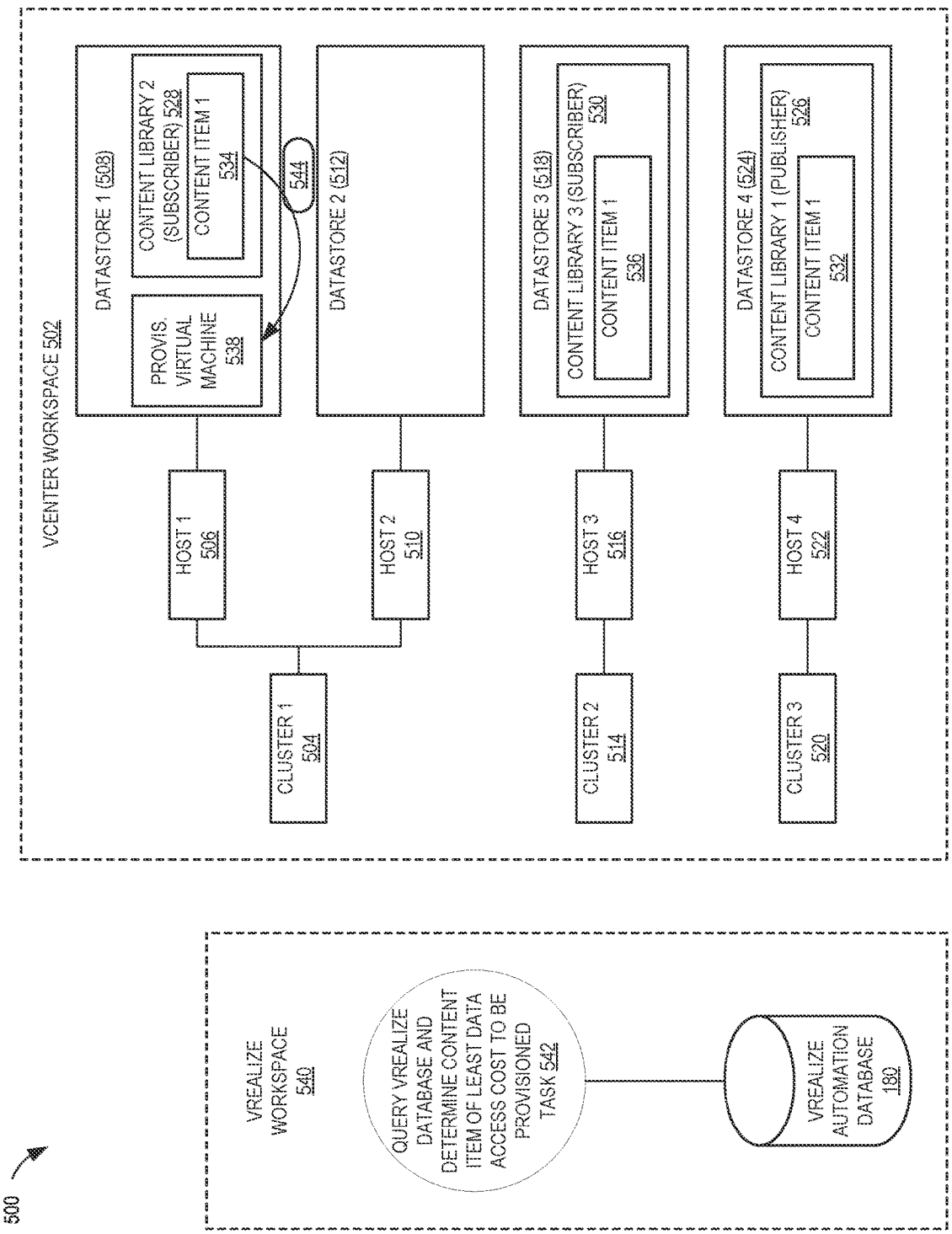
FIG. 5 is an illustration of an example network system implementing a first content item provisioning option in a publisher/subscriber model.

FIG. 5 is an illustration of an example network system 500 implementing a first content item provisioning option in a publisher/subscriber model. In the illustrated example of FIG. 5, a VMware vCenter® virtual infrastructure server workspace 502 includes a diagram of clusters, hosts, and datastores that are under the purview of the VMware vCenter® virtual infrastructure server 130. The example VMware vCenter® virtual infrastructure server workspace 502 includes cluster 1 (504), cluster 2 (514), and cluster 3 (520). Example cluster 1 (504) includes host 1 (506) and associated datastore 1 (508) as well as host 2 (510) and associated datastore 2 (512) Example cluster 2 (514) includes host 3 (516) and associated datastore 3 (518) Example cluster 3 (520) includes host 4 (522) and associated datastore 4 (524).

The example network system 500 includes a publisher/subscriber model of content item provisioning. In some examples, this publisher/subscriber model includes a publisher content library, such as content library 1 (526), and one or more subscriber content libraries, such as content library 2 (528) and content library 3 (530). Within the content libraries described is an example content item 1. In some examples, the vRealize Automation® management platform 140 causes the published copy (e.g., original copy) of content item 1 (532) to be stored in content library 1 (526). In some examples, the vRealize Automation® management platform 140 causes the subscriber copies of content item 1 (534 and 536) to be stored in content libraries 2 and 3 (528 and 530), respectively. In some examples, the vRealize Automation® management platform 140 provisions a virtual machine on host 1 (506) and causes an image of the provisioned virtual machine 538 to be stored in datastore 1 (508).

In some examples, a VM provisioning request (216 in FIG. 2) requests published content item 1 (532) be provisioned for access by the provisioned virtual machine 538. In the illustrated example of FIG. 5, a vRealize Automation® workspace 540 includes a query task 542 to be implemented by vRealize Automation® management platform 140 to determine which subscriber content item in the VMware vCenter® virtual infrastructure server workspace 502 is to be provisioned for access by the provisioned virtual machine 538. The example vRealize Automation® management platform 140 executes the query task 542 by querying the subscription guide database table 212 in the vRealize Automation® database 180 and determines the subscriber content item of least data access cost in reference to the provisioned virtual machine 538. The example vRealize Automation® management platform 140 then provisions 544 the determined subscriber content item for access by the provisioned virtual machine 538. In this scenario, example subscriber content item 1 (534) in content library 2 (528) has a smaller/lesser/lower data access cost (e.g., an intra-host access) than subscriber content item 1 (536) in content library 3 (530) (e.g., an inter-cluster access) and published content item 1 (532) in content library 1 (526) (e.g., also an inter-cluster access).

FIG. 6 is an illustration of an example network system 600 implementing a second content item provisioning option in a publisher/subscriber model. In the illustrated example of FIG. 6, a VMware vCenter® virtual infrastructure server workspace 602 includes a diagram of clusters, hosts, and datastores that are under the purview of a VMware vCenter® virtual infrastructure server 130. The example VMware vCenter® virtual infrastructure server workspace 602 includes cluster 1 (604), cluster 2, (614), and cluster 3 (620). Example cluster 1 (604) includes host 1 (606) and associated datastore 1 (608) as well as host 2 (610) and associated datastore 2 (612). Example cluster 2 (614) includes host 3 (616) and associated datastore 3 (618). Example cluster 3 (620) includes host 4 (622) and associated datastore 4 (624).

The example network system 600 includes a publisher/subscriber model of content item provisioning. In some examples, this publisher/subscriber model includes a publisher content library, such as content library 1 (626), and one or more subscriber content libraries, such as content library 2 (628) and content library 3 (630). Within the content libraries described is an example content item 1. In some examples, the vRealize Automation® management platform 140 causes the published copy (e.g., original copy) of content item 1 (632) to be stored in content library 1 (626). In some examples, the vRealize Automation® management platform 140 causes the subscriber copies of content item 1 (634 and 636) to be stored in content libraries 2 and 3 (628 and 630), respectively. In some examples, the vRealize Automation® management platform 140 provisions a virtual machine on host 2 (610) and causes the image of the provisioned virtual machine 638 to be stored in datastore 2 (612).

In some examples, a VM provisioning request (e.g., VM provisioning request 216 in FIG. 2) requests published content item 1 (632) be provisioned for access by the provisioned virtual machine 638. In the illustrated example of FIG. 6, a vRealize Automation® workspace 640 includes a task 642 to be implemented by vRealize Automation® management platform 140 to determine which subscriber content item in the VMware vCenter® virtual infrastructure server workspace 602 is to be provisioned for access by the provisioned virtual machine 638. The example vRealize Automation® management platform 140 executes the task 642 by querying the subscription guide database table 212 in the vRealize Automation® database 180 and determines the subscriber content item of least data access cost in reference to the provisioned virtual machine 638. The example vRealize Automation® management platform 140 then provisions 644 the determined subscriber content item for access by the provisioned virtual machine 638. In this scenario, example subscriber content item 1 (634) in content library 2 (628) has a smaller/lesser/lower data access cost (e.g., an intra-cluster) than subscriber content item 1 (636) in content library 3 (630) (e.g., an inter-cluster access) and published content item 1 (632) in content library 1 (626) (e.g., also an inter-cluster access).

Figure 7:
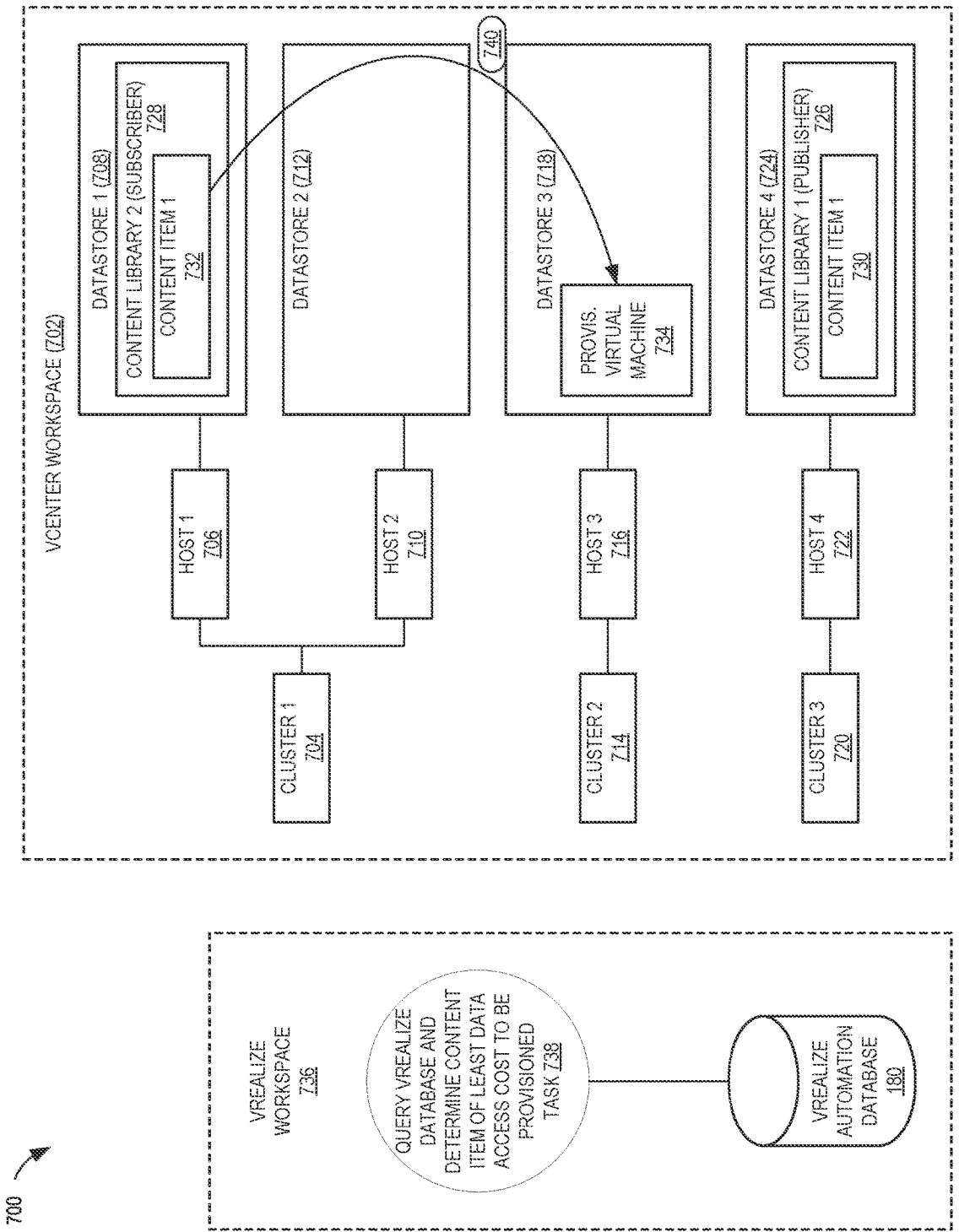
FIG. 7 is an illustration of an example network system implementing a third content item provisioning option in a publisher/subscriber model.

FIG. 7 is an illustration of an example network system 700 implementing a third content item provisioning option in a publisher/subscriber model. In the illustrated example of FIG. 7, a VMware vCenter® virtual infrastructure server workspace 702 includes a diagram of clusters, hosts, and datastores that are under the purview of a VMware vCenter® virtual infrastructure server 130. The example VMware vCenter® virtual infrastructure server workspace 702 includes cluster 1 (704), cluster 2 (714), and cluster 3 (720). Example cluster 1 (704) includes host 1 (706) and associated datastore 1 (708) as well as host 2 (710) and associated datastore 2 (712). Example cluster 2 (714) includes host 3 (716) and associated datastore 3 (718). Example cluster 3 (720) includes host 4 (722) and associated datastore 4 (724).

The example network system 700 includes a publisher/subscriber model of content item provisioning. In some examples, this publisher/subscriber model includes a publisher content library, such as content library 1 (726), and one or more subscriber content libraries, such as content library 2 (728). Within the content libraries described is an example content item 1. In some examples, the vRealize Automation® management platform 140 causes the published copy (e.g., original copy) of content item 1 (730) to be stored in content library 1 (726). In some examples, the vRealize Automation® management platform 140 causes the subscriber copy of content item 1 (732) to be stored in content library 2 (728). In some examples, the vRealize Automation® management platform 140 provisions a virtual machine on host 3 (716) and causes the image of the provisioned virtual machine 734 to be stored in datastore 3 (718).

In some examples, a VM provisioning request (e.g., VM provisioning request 216 in FIG. 2) requests published content item 1 (730) be provisioned for access by the provisioned virtual machine 734. In the illustrated example of FIG. 7, a vRealize Automation® workspace 736 includes a query task 738 to be implemented by vRealize Automation® management platform 140 to determine which subscriber content item in the VMware vCenter® virtual infrastructure server workspace 702 is to be provisioned for access by the provisioned virtual machine 734. The example vRealize Automation® management platform 140 executes the query task 738 by querying the subscription guide database table 212 in the vRealize Automation® database 180 and determines the subscriber content item of least data access cost in reference to the provisioned virtual machine 734. The example vRealize Automation® management platform 140 then provisions 740 the determined subscriber content item for access by the provisioned virtual machine 734. In this scenario, although subscriber content item 1 (732) in content library 2 (728) and published content item 1 (730) in content library 1 (726) both have the highest data access cost among the three types of data accesses (e.g., an inter-cluster access), the example vRealize Automation® management platform 140 provisions either subscriber content item 1 (732) or published content item 1 (730) for access by the provisioned virtual machine 734 because both are the same inter-cluster access and they are the only versions of the content item available.

While an example manner of implementing the vRealize Automation® management platform 140 of FIG. 2 is illustrated in FIG. 2, one or more of the elements, processes, and/or devices illustrated in FIG. 2 may be combined, divided, re-arranged, omitted, eliminated, and/or implemented in any other way. Further, the example VM provisioning circuitry 160, the example content item selection circuitry 170, the example content library querying circuitry 202, the example content library selection circuitry 204, the example data access cost determination circuitry 206, the example subscription guide management circuitry 208, the example metadata collection service circuitry 210, and/or, more generally, the example vRealize Automation® management platform circuitry 140 of FIG. 2, may be implemented by hardware, software, firmware, and/or any combination of hardware, software, and/or firmware hardware alone or by hardware in combination with software and/or firmware. Thus, for example, any of the example VM provisioning circuitry 160, the example content item selection circuitry 170, the example content library querying circuitry 202, the example content library selection circuitry 204, the example data access cost determination circuitry 206, the example subscription guide management circuitry 208, the example metadata collection service circuitry 210, and/or, more generally, the example vRealize Automation® management platform circuitry 140 of FIG. 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example VM provisioning circuitry 160, the example content item selection circuitry 170, the example content library querying circuitry 202, the example content library selection circuitry 204, the example data access cost determination circuitry 206, the example subscription guide management circuitry 208, the example metadata collection service circuitry 210, and the example vRealize Automation® management platform circuitry 140, is/are hereby expressly defined to include a non-transitory computer readable storage device or storage disk such as a memory, a digital versatile disk (DVD), a compact disk (CD), a Blu-ray disk, etc., including the software and/or firmware. Further still, the example vRealize Automation® management platform circuitry 140 of FIG. 2 may include one or more elements, processes, and/or devices in addition to, or instead of, those illustrated in FIG. 12, and/or may include more than one of any or all of the illustrated elements, processes and devices.

Flowcharts representative of example hardware logic circuitry, machine readable instructions, hardware implemented state machines, and/or any combination thereof for implementing the vRealize Automation® management platform circuitry 140 are shown in FIGS. 8-11. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program(s) is/are described with reference to the flowcharts illustrated in FIGS. 8-11, many other methods of implementing the example vRealize Automation® management platform circuitry 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8-11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 8:
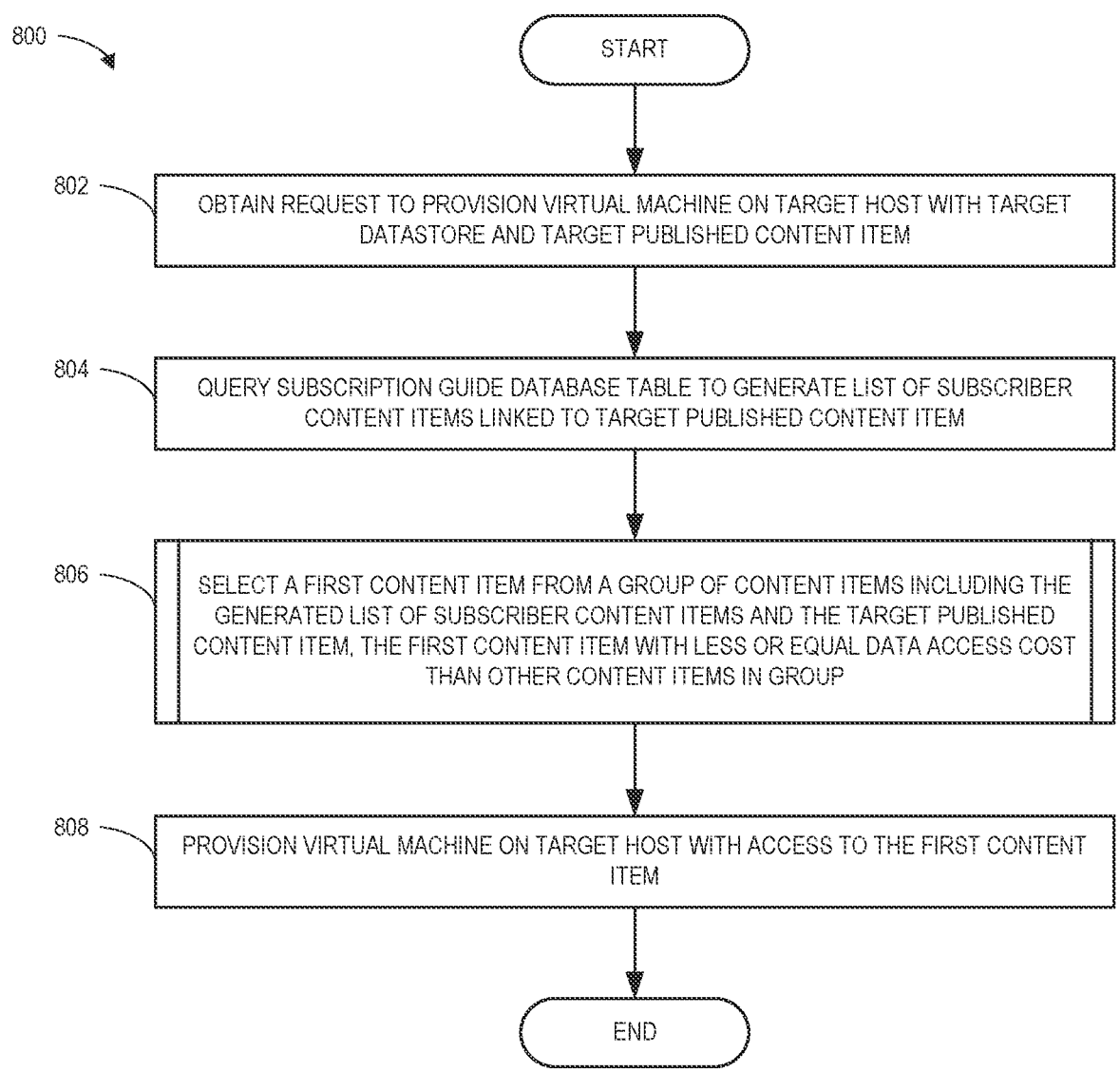
FIG. 8 is a flowchart representative of example machine readable instructions and/or example operations that may be executed and/or instantiated by example processor circuitry to select a content item for provisioning.

FIG. 8 is a flowchart representative of example machine readable instructions and/or example operations 800 that may be executed and/or instantiated by processor circuitry to select a content item for provisioning. The machine readable instructions and/or operations 800 of FIG. 8 begin at block 802, at which the example VM provisioning circuitry 160 (FIGS. 1 and 2) obtains a request to provision a virtual machine (e.g., VM provisioning request 216 in FIG. 2) on a target host with a target datastore and a target published content item. In some examples, the provisioning request includes an identification of a target host and a target datastore on which to provision the virtual machine. Additionally, the example request includes the identification of a target published content item for which to provision and provide access rights to the virtual machine (e.g., "target" published content item PCI-00004281 in FIG. 3). In some examples, the target published content item is available in a published content library (e.g., published content library PCL-0003 in FIG. 3). In some examples, a published content library is implemented through a publisher/subscriber model. An example published content library (e.g., content library 1 (publisher) 526 in FIG. 5) includes one or more example content items (e.g., content item 1 (532) in FIG. 5). The content items are each one or more data files and/or metadata, in some examples. More specifically, the example target published content item at least one of the data files and/or metadata stored in the example target published content library. In some examples, the term "target" refers to a specific host or datastore or content item specified in the VM provisioning request 216.

At block 804, the example content library querying circuitry 202 (FIG. 2) queries the subscription guide database table 212 (FIGS. 2 and 3) to generate a list of subscriber content items linked to the target published content item. For example, the content library querying circuitry 202 searches the subscription guide database table 212 for every subscriber content item ID 312 (FIG. 3) linked to the target published content item ID 322 (FIG. 3). The results of the query generate the list of linked subscriber content item IDs 312.

At block 806, the example content library selection circuitry 204 (FIG. 2) selects a first content item from a group of content items that include the generated list of subscriber content items and the target published content item, the selected first content item has a data access cost that is less than or equal to data access costs of other content items in the group of content items. Block 806 is described in greater detail the flowchart of FIG. 9.

At block 808, the example VM provisioning circuitry 160 (FIGS. 1 and 2) provisions the virtual machine on the target host with provisioned access rights to the first subscriber content item. The example machine readable instructions and/or the example operations 800 of FIG. 8 conclude.

FIG. 9 is a flowchart representative of example machine readable instructions and/or example operations 900 that may be executed and/or instantiated by processor circuitry to compare data access costs among subscriber content items to determine which subscriber content item to select for provisioning. The machine readable instructions and/or operations 900 of FIG. 9 begin at block 902, at which the example data access cost determination circuitry 206 (FIG. 2) sets a first content item in a group of content items (e.g., the group of content items includes the generated list of subscriber content items and the target published content item) as a current content item.

In some examples, the example data access cost determination circuitry 206 compares the data access cost of each content item in the group of content items in a linear fashion, one content item at a time. During such comparisons, the "current" content item is a position in the list for which the data access cost determination circuitry 206 is currently determining a data access cost.

At block 904, the example data access cost determination circuitry 206 performs a lookup of the network location of the datastore that stores the current content item in the group of content items and a network location of the target host (and the target datastore associated with the target host) on a datastore topology map 214 (FIG. 2) to determine a data access type. As discussed above, in some examples, the data access "type" is defined as one of: A) an intra-host access, B) an intra-cluster, or C) an inter-cluster access. In other examples, any additional or different number of defined data access types may be utilized to provide fewer or more data access types. For example, more data access types may be defined to create a more finely grained set of definitions of data access types. In some examples, the datastore topology map 214 includes information that verifies the relative location of each cluster, host, and datastore with respect to all other clusters, hosts, and datastores. Thus, the example data access cost determination circuitry 206 utilizes the datastore topology map 214 to determine whether one or more inter-host boundaries and/or one or more inter-cluster boundaries are required to be crossed when a data access occurs between a host/datastore at a first network location and a host/datastore at a second network location.

At block 906, the example data access cost determination circuitry 206 applies a set of data access cost rules to the data access type to determine the data access cost of provisioning access rights to the virtual machine to access the current content item. In some examples, the data access cost determination circuitry 206 keeps track of a smallest data access cost value among the content items in the group of content items. In some examples, the smallest data access cost value may be stored in a memory location, in a register, or elsewhere that data can be stored, modified, and/or utilized for calculations.

Example data access cost rules include costs for the different types of data accesses. In some examples, the data access cost of an intra-host access is the least cost among the above-defined access types due to the bandwidth of data transfers within a single host (e.g., a local file copy between two storage locations in a single datastore).

In some examples, the data access cost of an intra-cluster access is greater than the data access cost of the intra-host access because the accessed data requires a transfer between hosts, which normally utilizes some form of network file copy. The example intra-cluster access of data is localized to the single cluster, which minimizes larger network bandwidth impacts because both hosts participating in the intra-cluster access are located in a single cluster of hosts. Thus, in the example intra-cluster access, data is transferred from a first datastore associated with a first host in the cluster to a second datastore associated with a second host in the same cluster. In some examples, a cluster of hosts is implemented to share data transfer capabilities among the hosts in the cluster that exceed the bandwidth capacity of general network data traffic between hosts of different clusters.

In some examples, the data access cost of an inter-cluster access is greater than the data access cost of the intra-cluster access. The example inter-cluster access corresponds to a transfer of data between two hosts that reside in different clusters (or reside in no clusters at all). In some examples, when one host in a first cluster accesses data located in the datastore associated with a second host in a second cluster, a network file copy is utilized to transfer the data across the network. Because the network is shared among many hosts and many clusters, the bandwidth of the data transfer corresponding to the example inter-cluster access may be the slowest, thus the data access cost is the greatest (among the above example three types of data access costs).

Additionally, at block 906, if the determined data access cost is associated with the first content item in the group of content items, then the example data access cost determination circuitry 206 sets the smallest data access cost value to the data access cost calculated for the first content item because no other data access costs have yet been determined. Then, for each subsequent content item in the group of content items, at block 908, the example data access cost determination circuitry 206 compares the data access cost of the current content item to the smallest data access cost value to determine whether the data access cost of the current subscriber content item is less than or equal to the smallest data access cost value.

In some examples, if the data access cost determination circuitry 206 determines at block 908 that the data access cost of the current content item is less than or equal to (or in, some examples, simply less than) the smallest data access cost value, then, at block 910, the content library selection circuitry 204 (FIG. 2) selects the current content item as the content item for which to provision access rights to the virtual machine on the target host and updates the smallest data access cost value. For example, the content library selection circuitry 204 updates the smallest data access cost value with the data access cost value calculated for the current content item. In some examples, if the data access cost determination circuitry 206 determines at block 908 that the data access cost of the current content item is greater than the smallest data access cost value, then block 910 is skipped. In such scenarios, the previous smallest data access cost value remains unchanged and the content item for which access rights are to be provisioned for the virtual machine also remains unchanged. In some examples, the first content item in the group of content items is utilized as the default content item for which access rights are to be provisioned for the virtual machine. In these examples, the first content item is utilized if no other content item in the group of content items has a lower data access cost than the first content item.

At block 912, the example content library selection circuitry 204 checks if the current content item is the end of the group of content items. If there are more content items in the group of content items, then, at block 914, the example content library selection circuitry 204 sets the next content item in the group of content items as the current content item and the process returns to block 904 for the purpose of repeating the described steps on the next content item in the group of content items. Otherwise, if there are no additional content items in the group of content items, then the example machine readable instructions and/or the example operations 900 of FIG. 9 conclude.

Figure 10:
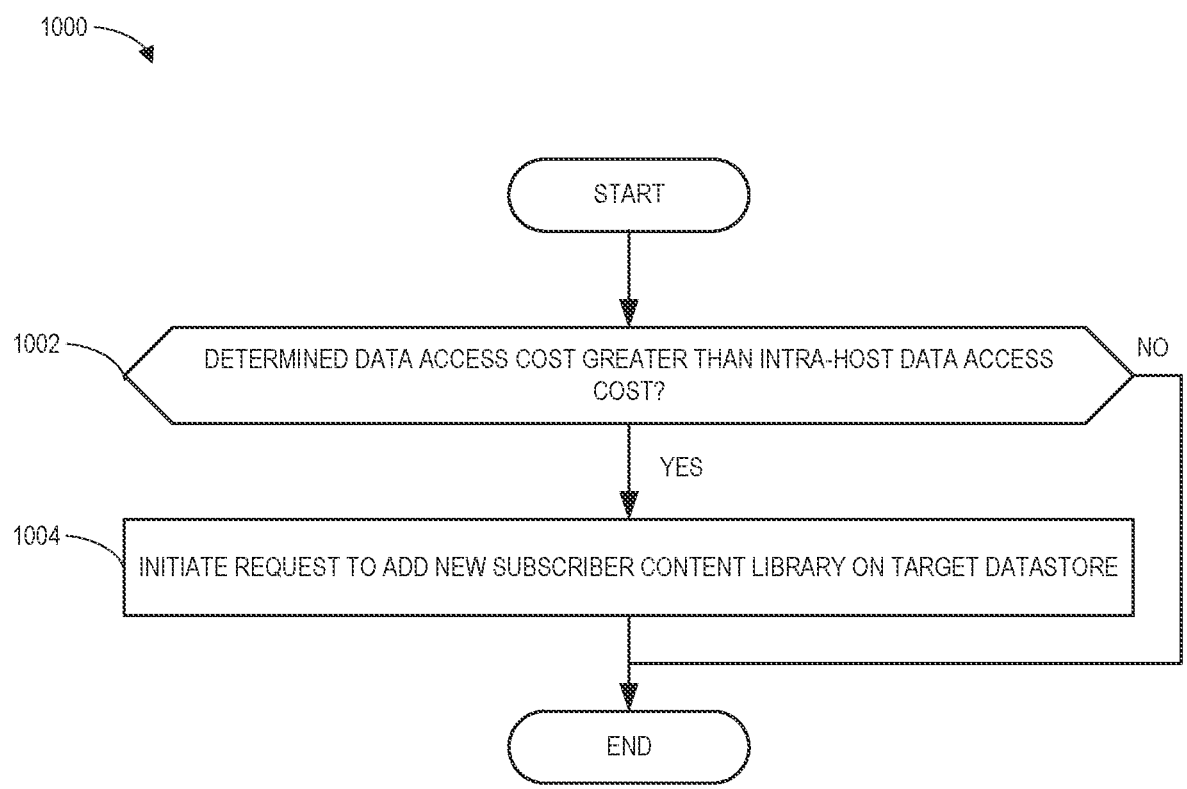
FIG. 10 is a flowchart representative of example machine readable instructions and/or example operations that may be executed and/or instantiated by processor circuitry to initiate a request for a new content library subscription.

FIG. 10 is a flowchart representative of example machine readable instructions and/or example operations 1000 that may be executed and/or instantiated by processor circuitry to initiate a request for a new content library subscription. In some examples, the flowchart in FIG. 10 is implemented when a data access cost of the selected content item from FIG. 9 is greater than the lowest data access cost (e.g., an intra-host transfer). In some examples, there may be a threshold discrepancy between the data access cost of the selected content item from FIG. 9 and a lowest data access cost (e.g., an intra-cluster transfer may not trigger the process of FIG. 10, but an inter-cluster transfer may trigger the process of FIG. 10). For example, a newly published content library may have popular content and begin receiving multiple access requests during in virtual machine provisioning. In some examples, once a threshold number of content item access requests for content items in a content library have been received, the flowchart of FIG. 10 is implemented. The machine readable instructions and/or operations 1000 of FIG. 10 begin at block 1002, at which the example subscription guide management circuitry 208 (FIG. 2) determines if the data access cost (calculated/determined by the example content library selection circuitry 204 at block 904 of FIG. 9) associated with the selected content item is greater than the data access cost of an intra-host access. In some examples, the intra-host access is the least costly of data access costs because an intra-host access allows the data (e.g., file(s)) that makes up the subscriber content item to stay in the same datastore associated with the same host. For example, the file transfer from the content library in which the subscriber content item is located to the provisioned virtual machine happens between two storage locations on the same datastore. In some examples, any file transfer that moves files between hosts in a cluster or between clusters of hosts will have a greater data access cost than the intra-host access. Thus, if the data access cost is greater than an intra-host access, it may be inferred, in some examples, that a subscriber content library containing a copy of the subscriber content item is not present in the target datastore associated with the target host.

If the subscription guide management circuitry 208 determines at block 1002 that the data access cost is greater than an intra-host access access cost, then, at block 1004, the example subscription guide management circuitry 208 (FIG. 2) initiates a request to add a new subscriber content library on the target datastore. The example machine readable instructions and/or the example operations 1000 of FIG. 10 conclude. In some examples, the new subscriber content library subscribes to the published content library that has the original version of the subscriber content item (e.g., the target published content item). In some examples, once a subscription to the published content library containing the target published content item is implemented at the target datastore associated with the target host, the data access cost will be reduced to an intra-host access cost.

Figure 11:
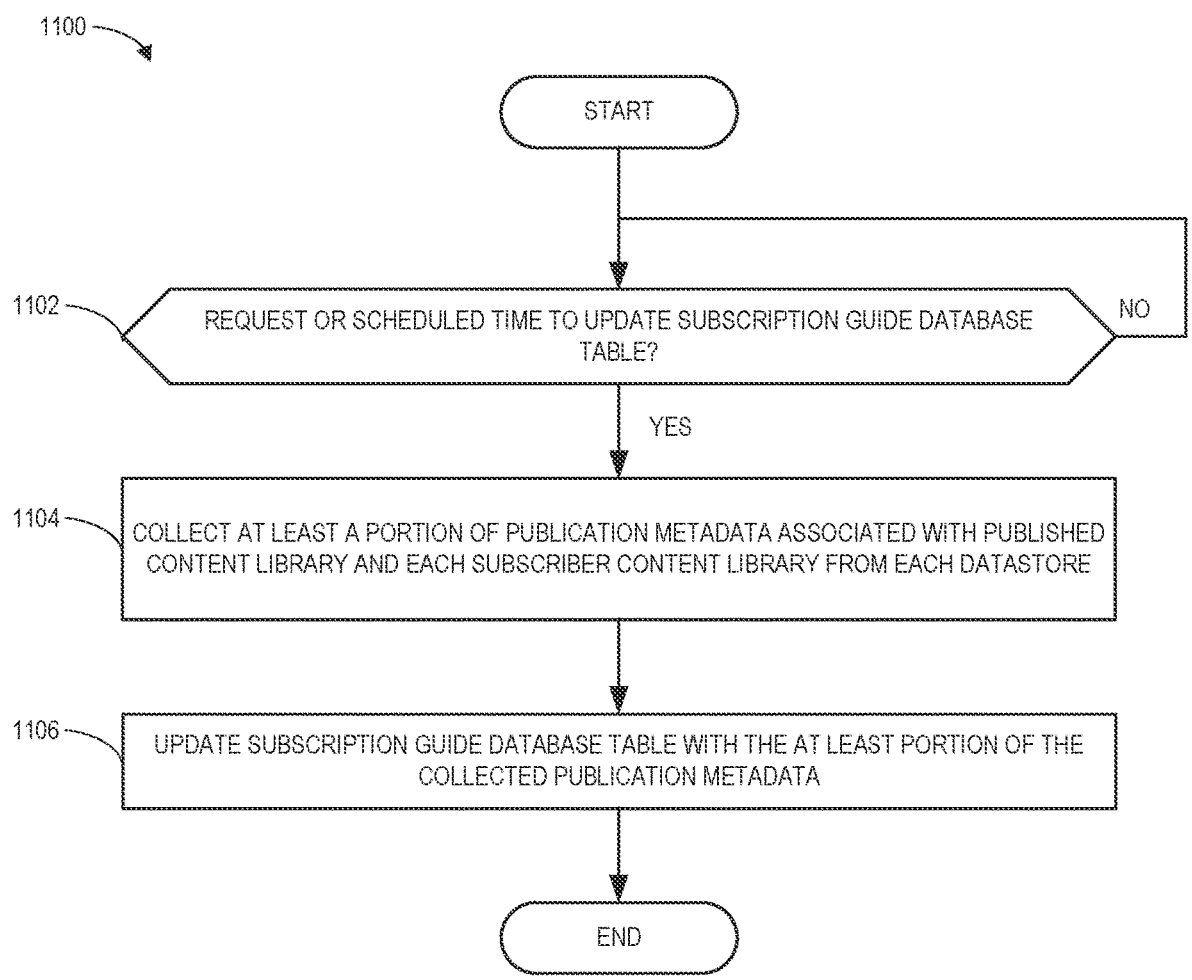
FIG. 11 is a flowchart representative of example machine readable instructions and/or example operations that may be executed and/or instantiated by processor circuitry to collect publication metadata associated with a published content library and one or more subscriber content libraries subscribing to the published content library.

FIG. 11 is a flowchart representative of example machine readable instructions and/or example operations 1100 that may be executed and/or instantiated by processor circuitry to collect publication metadata associated with a published content library and one or more subscriber content libraries subscribing to the published content library. The machine readable instructions and/or operations 1100 of FIG. 11 begin at block 1102, at which the example metadata collection service circuitry 210 (FIG. 2) determines if a request is received or a scheduled time has arrived to update the subscription guide database table 212 (FIGS. 2 and 3). In some examples, an update request arrives from a requestor, which can be a database administrator requestor, an end user requestor, an application, a service running in an operating system kernel, or any other entity capable of requesting an update to the subscription guide database table 212. In some examples, a process to update the subscription guide database table 212 may be automated. The example metadata collection service circuitry 210 may implement an update schedule one or more times per day (e.g., a repeating scheduled time) to automatically begin an update to the subscription guide database table 212.

If the example metadata collection service circuitry 210 determines at block 1102 that a request is received or a scheduled time has arrived to update the subscription guide database table 212, then, at block 1104, the example metadata collection service circuitry 210 collects at least a portion of the publication metadata associated with the published content library and associated with each subscriber content library that corresponds to the data in the subscription guide database table 212. In some examples, the subscription guide database table 212 includes at least a list of published content items and a list of subscriber content items corresponding to the list of published content items. Each published content item in the example list of published content items includes: a published content item ID 302, a published content item name 304, an ID of the published content library 306, a corresponding published content library network location 308, and the datastore ID 310 the publisher content library is stored within. Each subscriber content item in the example list of subscriber content items includes: a subscriber content item ID 312, a subscriber content item name 314, a subscriber content library ID 316, a corresponding subscriber content library network location 318, a datastore ID 320 of the subscriber content library is stored within, and the corresponding publisher content item ID 322. Thus, in some examples, the metadata collection service circuitry 210 collects publication metadata associated with one or more of the above-listed data in the subscription guide database table 212.

At block 1106, the example metadata collection service circuitry 210 updates the subscription guide database table 212 with the at least a portion of the collected publication metadata (e.g., a new published content item may have been included in a published content library and included in subscriber content libraries corresponding to the published content library, the publication metadata may include the metadata 302-310 associated with the published content item and the metadata 312-322 associated with the corresponding subscriber content items. The example machine readable instructions and/or the example operations 1100 of FIG. 11 conclude. In some examples, if one or more published content items are added, modified, and/or removed from the published content library, the collected metadata verifies any such changes and the changes are then reflected in the updated subscription guide database table 212. For example, if a first content item is removed from the published content library, the collected metadata shows the removal, either directly or through a comparison of a current list of content items in the published content library to a previously saved list of content items that were in the published content library. [part 1 review stops here]

Figure 12:
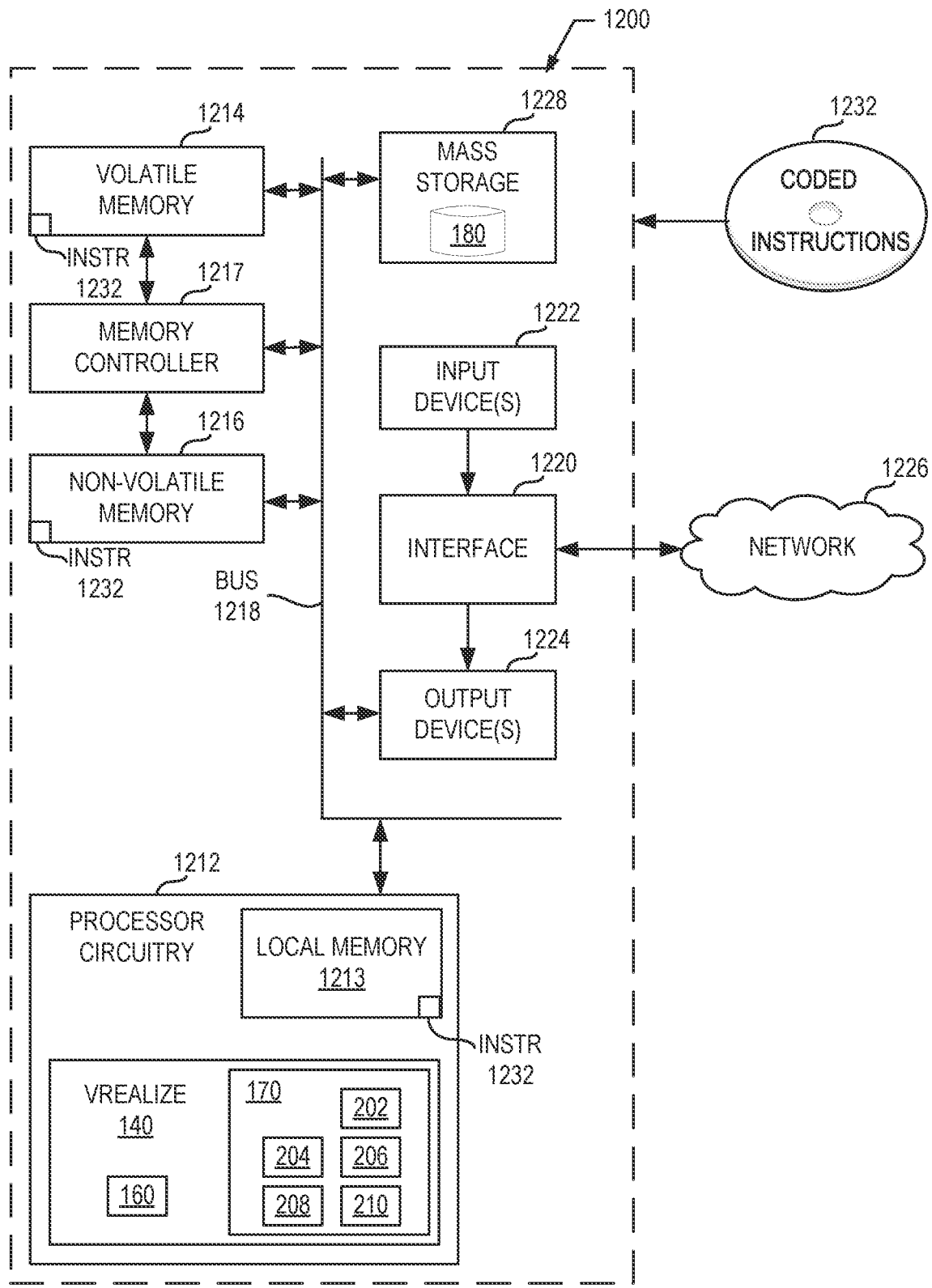
FIG. 12 is a block diagram of an example processor platform structured to execute and/or instantiate the machine readable instructions and/or operations of FIGS. 8-11 to implement the vRealize Automation® management platform circuitry of FIG. 2

FIG. 12 is a block diagram of an example processor platform 1200 structured to execute and/or instantiate the machine readable instructions and/or operations of FIGS. 8-11 to implement the vRealize Automation® management platform circuitry 140 of FIG. 2. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements VM provisioning circuitry 160, the example content item selection circuitry 170, the example content library querying circuitry 202, the example content library selection circuitry 204, the example data access cost determination circuitry 206, the example subscription guide management circuitry 208, the example metadata collection service circuitry 210, and the example vRealize Automation® management platform circuitry 140.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1232, which may be implemented by the machine readable instructions of FIGS. 8-11, may be stored in the mass storage device 1228, in the volatile memory 1214, in the non-volatile memory 1216, and/or on a removable non-transitory computer readable storage medium such as a CD or DVD.

Figure 13:
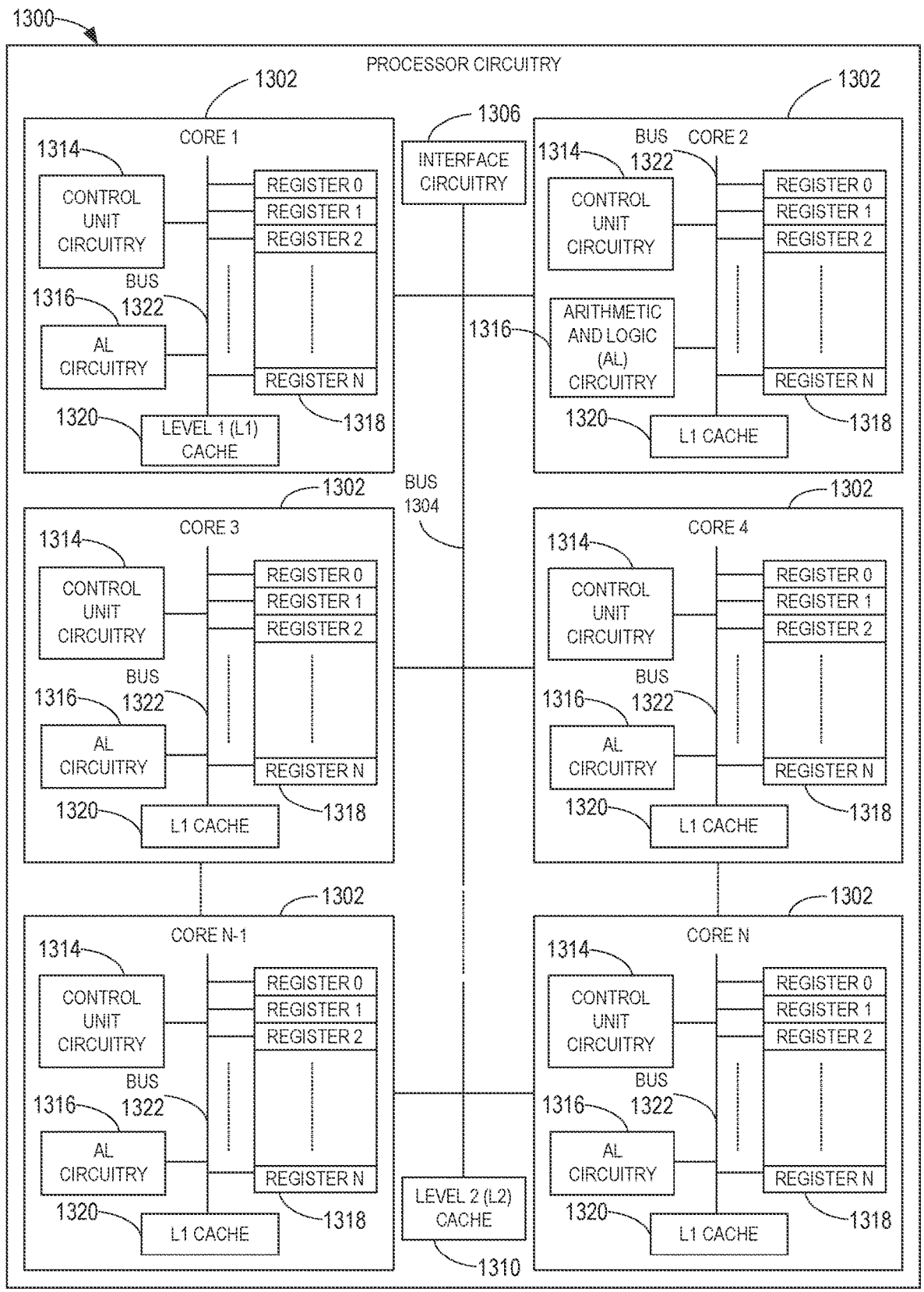
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a microprocessor 1300. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 8-11.

The cores 1302 may communicate by an example bus 1304. In some examples, the bus 1304 may implement a communication bus to effectuate communication associated with one(s) of the cores 1302. For example, the bus 1304 may implement at least one of an Inter-Integrated Circuit (I2C) bus, a Serial Peripheral Interface (SPI) bus, a PCI bus, or a PCIe bus. Additionally or alternatively, the bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and an example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The bus 1320 may implement at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
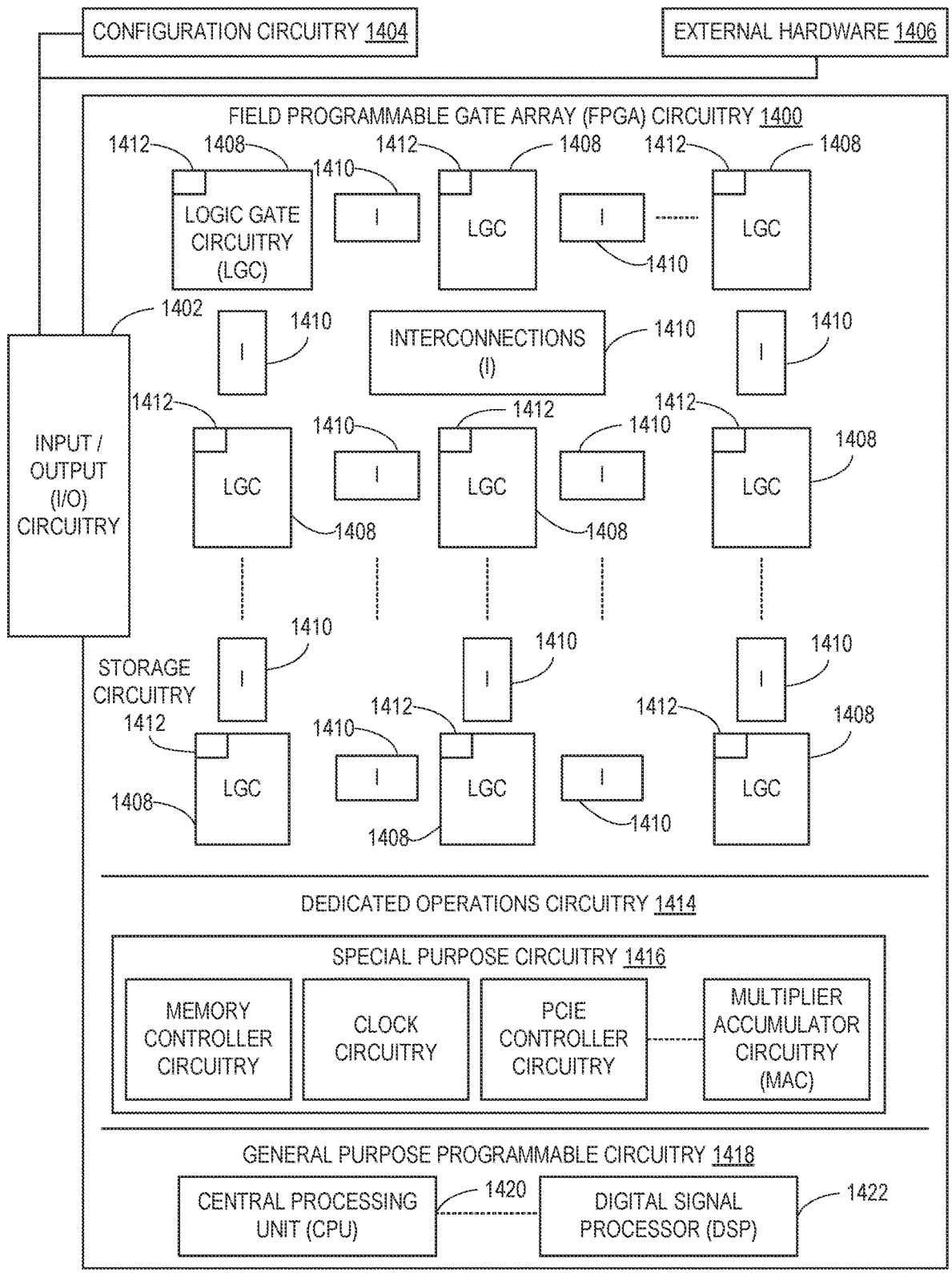
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 8-11 but whose interconnections and logic circuitry are fixed once fabricated), the FPGA circuitry _00 of the example of FIG. 6 includes interconnections and logic circuitry that may be configured and/or interconnected in different ways after fabrication to instantiate, for example, some or all of the machine readable instructions represented by the flowcharts of FIGS. 8-11. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 8-11. As such, the FPGA circuitry 1400 may be structured to effectively instantiate some or all of the machine readable instructions of the flowcharts of FIGS. 8-11 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 8-11 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIGS. 8-11 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by at least the flowchart of FIG. 8 may be executed by one or more of the cores 1302 of FIG. 13 and a second portion of the machine readable instructions represented at least by the flowchart of FIG. 8 may be executed by the FPGA circuitry 1400 of FIG. 14.

In some examples, the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

Figure 15:
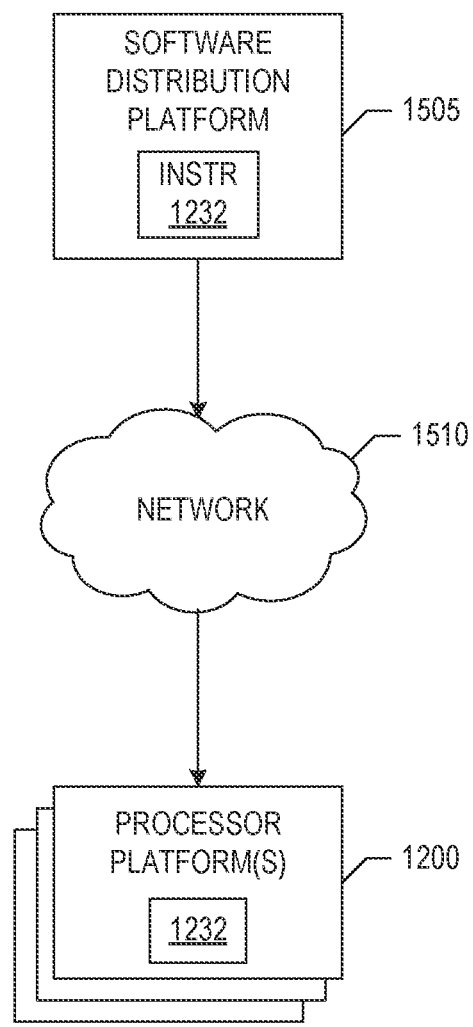
FIG. 15 is a block diagram of an example software distribution platform (e.g., one or more servers) to distribute software (e.g., software corresponding to the example machine readable instructions of FIGS. 8-11) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions 800, 900, 1000, and 1100 of FIGS. 8-11, as described above. The one or more servers of the example software distribution platform 1505 are in communication with a network 1510, which may correspond to any one or more of the Internet and/or any of the example networks, such as network 120 and/or network 1226 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions 800 of FIG. 8, may be downloaded to the example processor platform 1200, which is to execute the machine readable instructions 1232 to implement the vRealize Automation® management platform circuitry 140. In some example, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed that implement an intelligent selection of content items for provisioning. The disclosed systems, methods, apparatus, and articles of manufacture improve the efficiency of using a computing device by reducing the cost of accessing provisioned content items by virtual machines using a subscriber/publisher model. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to implement intelligent selection of content items for provisioning are disclosed herein. Further examples and combinations thereof include the following:

Example 1 includes an apparatus, comprising content library querying circuitry to, in response to a request to provision a virtual machine on a target host, query a subscription guide database table to generate a list of subscriber content items linked to a target published content item indicated in the request, the target published content item and ones of the subscriber content items from the list of the subscriber content items are located in at least one of a plurality of datastores on a network, content library selection circuitry to select a first content item from a group of content items, the group of content items including the generated list of the subscriber content items and the target published content item, the first content item corresponding to a first data access cost that is less than or equal to a second data access cost of a second content item in the group, and virtual machine provisioning circuitry to provision the virtual machine on the target host and with access to the first content item.

Example 2 includes the apparatus of example 1, further including data access cost determination circuitry to determine the first data access cost for the virtual machine on the target host to access the first subscriber content item based on data access cost rules and a comparison of a first network location of the target host to a second network location of the first subscriber content item.

Example 3 includes the apparatus of example 2, wherein the data access cost rules include an intra-host data access cost, an intra-cluster data access cost, and an inter-cluster data access cost.

Example 4 includes the apparatus of example 3, further including subscription guide management circuitry to, in response to the first data access cost being greater than the intra-host data access cost, initiate a second request to add a subscriber content library on a datastore associated with the target host.

Example 5 includes the apparatus of example 1, wherein the subscription guide database table includes publication metadata, the publication metadata indicative of a published content item identification, a published content item name, a published content library identification, a corresponding published content library network location, the identification of a datastore the published content library is stored within, a subscriber content item identification, a subscriber content item name, a subscriber content library identification, a corresponding subscriber content library network location, a datastore identification the subscriber content library is stored within, and the corresponding published content item identification.

Example 6 includes the apparatus of example 5, further including metadata collection service circuitry to collect at least a portion of the publication metadata from one or more of the plurality of datastores on the network, the publication metadata associated with the published content library and ones of the subscriber content libraries, and update the subscription guide database table to include the at least the portion of the publication metadata.

Example 7 includes the apparatus of example 6, wherein the metadata collection service circuitry is to collect the at least the portion of the publication metadata and update the subscription guide database table at a repeating scheduled time.

Example 8 includes the apparatus of example 6, wherein the metadata collection service circuitry is to collect the at least the portion of the publication metadata and update the subscription guide database table in response to an update request.

Example 9 includes At least one non-transitory computer readable storage medium comprising instructions that, when executed, cause processor circuitry to at least in response to a request to provision a virtual machine on a target host, query a subscription guide database table to generate a list of subscriber content items linked to a target published content item indicated in the request, the target published content item and ones of the subscriber content items from the list of the subscriber content items are located in at least one of a plurality of datastores on a network, select a first content item from a group of content items, the group of content items including the generated list of the subscriber content items and the target published content item, the first content item corresponding to a first data access cost that is less than or equal to a second data access cost of a second content item in the group, and provision the virtual machine on the target host and with access to the first content item.

Example 10 includes the at least one non-transitory computer readable medium of example 9, wherein the instructions, when executed, cause the processor circuitry to determine the first data access cost for the virtual machine on the target host to access the first subscriber content item based on data access cost rules and a comparison of a first network location of the target host to a second network location of the first subscriber content item.

Example 11 includes the at least one non-transitory computer readable medium of example 10, wherein the data access cost rules include an intra-host data access cost, an intra-cluster data access cost, and an inter-cluster data access cost.

Example 12 includes the at least one non-transitory computer readable medium of example 11, wherein the instructions, when executed, cause the processor circuitry to in response to the first data access cost being greater than the intra-host data access cost, initiate a second request to add a subscriber content library on a datastore associated with the target host.

Example 13 includes the at least one non-transitory computer readable medium of example 9, wherein the subscription guide database table includes publication metadata, the publication metadata indicative of a published content item identification, a published content item name, a published content library identification, a corresponding published content library network location, the identification of a datastore the published content library is stored within, a subscriber content item identification, a subscriber content item name, a subscriber content library identification, a corresponding subscriber content library network location, a datastore identification the subscriber content library is stored within, and the corresponding published content item identification.

Example 14 includes the at least one non-transitory computer readable medium of example 13, wherein the instructions, when executed, cause the processor circuitry to collect at least a portion of the publication metadata from one or more of the plurality of datastores on the network, the publication metadata associated with the published content library and ones of the subscriber content libraries, and update the subscription guide database table to include the at least the portion of the publication metadata.

Example 15 includes the at least one non-transitory computer readable medium of example 14, wherein the instructions, when executed, cause the processor circuitry to collect the at least the portion of the publication metadata and update the subscription guide database table at a repeating scheduled time.

Example 16 includes the at least one non-transitory computer readable medium of example 14, wherein the instructions, when executed, cause the processor circuitry to collect the at least the portion of the publication metadata and update the subscription guide database table in response to an update request.

Example 17 includes a method, comprising in response to a request to provision a virtual machine on a target host, querying a subscription guide database table to generate a list of subscriber content items linked to a target published content item indicated in the request, the target published content item and ones of the subscriber content items from the list of the subscriber content items are located in at least one of a plurality of datastores on a network, selecting a first content item from a group of content items, the group of content items including the generated list of the subscriber content items and the target published content item, the first content item corresponding to a first data access cost that is less than or equal to a second data access cost of a second content item in the group, and provisioning the virtual machine on the target host and with access to the first content item.

Example 18 includes the method of example 17, further including determining the first data access cost for the virtual machine on the target host to access the first subscriber content item based on data access cost rules and a comparison of a first network location of the target host to a second network location of the first subscriber content item.

Example 19 includes the method of example 18, wherein the data access cost rules include an intra-host data access cost, an intra-cluster data access cost, and an inter-cluster data access cost.

Example 20 includes the method of example 19, further including in response to the first data access cost being greater than the intra-host data access cost, initiating a second request to add a subscriber content library on a datastore associated with the target host.

Example 21 includes the method of example 17, wherein the subscription guide database table includes publication metadata, the publication metadata indicative of a published content item identification, a published content item name, a published content library identification, a corresponding published content library network location, the identification of a datastore the published content library is stored within, a subscriber content item identification, a subscriber content item name, a subscriber content library identification, a corresponding subscriber content library network location, a datastore identification the subscriber content library is stored within, and the corresponding published content item identification.

Example 22 includes the method of example 21, further including collecting at least a portion of the publication metadata from one or more of the plurality of datastores on the network, the publication metadata associated with the published content library and ones of the subscriber content libraries, and updating the subscription guide database table to include the at least the portion of the publication metadata.

Example 23 includes the method of example 22, further including collecting the at least the portion of the publication metadata and update the subscription guide database table at a repeating scheduled time.

Example 24 includes the method of example 22, further including collecting the at least the portion of the publication metadata and update the subscription guide database table in response to an update request.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus, comprising:
content library querying circuitry to, in response to a request to provision a virtual machine on a target host, query a subscription guide database table to generate a list of subscriber content items linked to a target published content item indicated in the request, the target published content item and ones of the subscriber content items from the list of the subscriber content items are located in at least one of a plurality of datastores on a network;
content library selection circuitry to select a first content item from a group of content items, the group of content items including the generated list of the subscriber content items and the target published content item, the first content item corresponding to a first data access cost that is less than or equal to a second data access cost of a second content item in the group, the first data access cost based on a comparison of a first network location of the target host to a second network location of a first datastore that stores the first content item;
virtual machine provisioning circuitry to provision the virtual machine on the target host and with access to the first content item; and
subscription guide management circuitry to, in response to the first data access cost being greater than an intra-host data access cost, initiate a second request to add a subscriber content library on a second datastore associated with the target host.

2. The apparatus of claim 1, further including:
data access cost determination circuitry to determine the first data access cost for the virtual machine on the target host to access the first content item based on data access cost rules.

3. The apparatus of claim 2, wherein the data access cost rules include the intra-host data access cost, an intra-cluster data access cost, and an inter-cluster data access cost.

4. The apparatus of claim 1, wherein the subscription guide database table includes publication metadata, the publication metadata indicative of a third network location of a published content library, fourth network locations of subscriber content libraries, a list of published content items in the published content library, and lists of the subscriber content items, ones of the lists of the subscriber content items corresponding to ones of the subscriber content libraries, the published content library including the target published content item, ones of the subscriber content libraries including ones of the subscriber content items from the list of the subscriber content items.

5. The apparatus of claim 4, further including metadata collection service circuitry to:
collect at least a portion of the publication metadata from one or more of the plurality of datastores on the network, the publication metadata associated with the published content library and ones of the subscriber content libraries; and
update the subscription guide database table to include the at least the portion of the publication metadata.

6. The apparatus of claim 5, wherein the metadata collection service circuitry is to collect the at least the portion of the publication metadata and update the subscription guide database table at a repeating scheduled time.

7. The apparatus of claim 5, wherein the metadata collection service circuitry is to collect the at least the portion of the publication metadata and update the subscription guide database table in response to an update request.

8. At least one non-transitory computer readable storage medium comprising instructions to cause programmable circuitry to at least:
in response to a request to provision a virtual machine on a target host, query a subscription guide database table to generate a list of subscriber content items linked to a target published content item indicated in the request, the target published content item and ones of the subscriber content items from the list of the subscriber content items are located in at least one of a plurality of datastores on a network;
select a first content item from a group of content items, the group of content items including the generated list of the subscriber content items and the target published content item, the first content item corresponding to a first data access cost that is less than or equal to a second data access cost of a second content item in the group, the first data access cost based on a comparison of a first network location of the target host to a second network location of a first datastore that stores the first content item;
provision the virtual machine on the target host and with access to the first content item; and
in response to the first data access cost being greater than an intra-host data access cost, initiate a second request to add a subscriber content library on a second datastore associated with the target host.

9. The at least one non-transitory computer readable medium of claim 8, wherein the instructions are to cause the programmable circuitry to:
determine the first data access cost for the virtual machine on the target host to access the first content item based on data access cost rules.

10. The at least one non-transitory computer readable medium of claim 9, wherein the data access cost rules include the intra-host data access cost, an intra-cluster data access cost, and an inter-cluster data access cost.

11. The at least one non-transitory computer readable medium of claim 8, wherein the subscriber content library is a first subscriber content library, the first content item is associated with a second subscriber content library, the subscription guide database table includes publication metadata, the publication metadata indicative of a published content item identification, a published content item name, a published content library identification, a corresponding published content library network location, a first datastore identification of a third datastore in which a published content library is stored, a subscriber content item identification, a subscriber content item name, a subscriber content library identification, a corresponding subscriber content library network location, a second datastore identification of the first datastore in which the second subscriber content library is stored, and the corresponding published content item identification.

12. The at least one non-transitory computer readable medium of claim 11, wherein the instructions are to cause the programmable circuitry to:
collect at least a portion of the publication metadata from one or more of the plurality of datastores on the network, the publication metadata associated with the published content library and ones of subscriber content libraries; and update the subscription guide database table to include the at least the portion of the publication metadata.

13. The at least one non-transitory computer readable medium of claim 12, wherein the instructions are to cause the programmable circuitry to collect the at least the portion of the publication metadata and update the subscription guide database table at a repeating scheduled time.

14. The at least one non-transitory computer readable medium of claim 12, wherein the instructions are to cause the programmable circuitry to collect the at least the portion of the publication metadata and update the subscription guide database table in response to an update request.

15. A method, comprising:
in response to a request to provision a virtual machine on a target host, querying, by executing an instruction with programmable circuitry, a subscription guide database table to generate a list of subscriber content items linked to a target published content item indicated in the request, the target published content item and ones of the subscriber content items from the list of the subscriber content items are located in at least one of a plurality of datastores on a network;
selecting, by executing an instruction with the programmable circuitry, a first content item from a group of content items, the group of content items including the generated list of the subscriber content items and the target published content item, the first content item corresponding to a first data access cost that is less than or equal to a second data access cost of a second content item in the group, the first data access cost based on a comparison of a first network location of the target host to a second network location of a first datastore that stores the first content item;
provisioning, by executing an instruction with the programmable circuitry, the virtual machine on the target host and with access to the first content item; and
in response to the first data access cost being greater than an intra-host data access cost, initiating, by executing an instruction with the programmable circuitry, a second request to add a subscriber content library on a second datastore associated with the target host.

16. The method of claim 15, further including:
determining the first data access cost for the virtual machine on the target host to access the first content item based on data access cost rules.

17. The method of claim 16, wherein the data access cost rules include the intra-host data access cost, an intra-cluster data access cost, and an inter-cluster data access cost.

18. The method of claim 15, wherein the subscriber content library is a first subscriber content library, the first content item is associated with a second subscriber content library, the subscription guide database table includes publication metadata, the publication metadata indicative of a published content item identification, a published content item name, a published content library identification, a corresponding published content library network location, a first datastore identification of a third datastore in which a published content library is stored, a subscriber content item identification, a subscriber content item name, a subscriber content library identification, a corresponding subscriber content library network location, a second datastore identification of the first datastore in which the second subscriber content library is stored, and the corresponding published content item identification.

19. The method of claim 18, further including:
collecting at least a portion of the publication metadata from one or more of the plurality of datastores on the network, the publication metadata associated with the published content library and ones of subscriber content libraries; and
updating the subscription guide database table to include the at least the portion of the publication metadata.

20. The method of claim 19, further including:
collecting the at least the portion of the publication metadata and update the subscription guide database table at a repeating scheduled time.

21. The method of claim 19, further including:
collecting the at least the portion of the publication metadata and update the subscription guide database table in response to an update request.

\* \* \* \* \*